(12) United States Patent
Cory et al.

(10) Patent No.: US 7,099,426 B1
(45) Date of Patent: Aug. 29, 2006

(54) FLEXIBLE CHANNEL BONDING AND CLOCK CORRECTION OPERATIONS ON A MULTI-BLOCK DATA PATH

(75) Inventors: Warren E. Cory, Redwood City, CA (US); Atul V. Ghia, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 794 days.

(21) Appl. No.: 10/234,978

(22) Filed: Sep. 3, 2002

(51) Int. Cl.
 *H04L 7/00* (2006.01)
(52) U.S. Cl. ........................................ 375/372
(58) Field of Classification Search ............... 375/372, 375/354, 371; 370/503, 505, 516; 711/110, 711/111
See application file for complete search history.

(56) References Cited

U.S. PATENT DOCUMENTS

| | | |
|---|---|---|
| 4,758,985 A | 7/1988 | Carter |
| 4,855,669 A | 8/1989 | Mahoney |
| 5,072,418 A | 12/1991 | Boutaud et al. |
| 5,142,625 A | 8/1992 | Nakai |
| RE34,363 E | 8/1993 | Freeman |
| 5,274,570 A | 12/1993 | Izumi et al. |
| 5,311,114 A | 5/1994 | Sambamurthy et al. |
| 5,339,262 A | 8/1994 | Rostoker et al. |
| 5,347,181 A | 9/1994 | Ashby et al. |
| 5,361,373 A | 11/1994 | Gilson |
| 5,457,410 A | 10/1995 | Ting |
| 5,473,267 A | 12/1995 | Stansfield |
| 5,500,943 A | 3/1996 | Ho et al. |
| 5,504,738 A | 4/1996 | Sambamurthy et al. |
| 5,537,601 A | 7/1996 | Kimura et al. |
| 5,543,640 A | 8/1996 | Sutherland et al. |
| 5,550,782 A | 8/1996 | Cliff et al. |
| 5,552,722 A | 9/1996 | Kean |
| 5,563,891 A * | 10/1996 | Wang ........................ 370/505 |
| 5,574,930 A | 11/1996 | Halverson, Jr. et al. |
| 5,574,942 A | 11/1996 | Colwell et al. |
| 5,581,745 A | 12/1996 | Muraoka |
| 5,600,845 A | 2/1997 | Gilson |
| 5,652,904 A | 7/1997 | Trimberger |
| 5,671,355 A | 9/1997 | Collins |
| 5,705,938 A | 1/1998 | Kean |

(Continued)

FOREIGN PATENT DOCUMENTS

EP      0315275 A2      10/1989

(Continued)

OTHER PUBLICATIONS

U.S. Appl. No. 10/090,250, filed Mar. 1, 2002, Menon et al.

(Continued)

*Primary Examiner*—Dac Ha
*Assistant Examiner*—Jaison Joseph
(74) *Attorney, Agent, or Firm*—John Rubodera; Thomas A. Ward

(57) ABSTRACT

An elastic buffer for buffering a stream of data blocks includes a controller and a memory space, wherein multiple data blocks can be written and read during a single write or read clock cycle, respectively. Multiple read addresses are used for each read operation, allowing read access to non-contiguous memory locations during a single read cycle when desired. Therefore, the elastic buffer can perform clock correction and channel bonding operations on data streams that include correction and alignment data block sequences that do not match the width of the memory space. A stagger bit can be used to indicate the timing of read address adjustments during clock correction and channel bonding operations.

35 Claims, 8 Drawing Sheets

U.S. PATENT DOCUMENTS

| | | | |
|---|---|---|---|
| 5,732,250 | A | 3/1998 | Bates et al. |
| 5,737,631 | A | 4/1998 | Trimberger |
| 5,740,404 | A | 4/1998 | Baji |
| 5,742,179 | A | 4/1998 | Sasaki |
| 5,742,180 | A | 4/1998 | DeHon et al. |
| 5,748,979 | A | 5/1998 | Trimberger |
| 5,752,035 | A | 5/1998 | Trimberger |
| 5,760,607 | A | 6/1998 | Leeds et al. |
| 5,809,517 | A | 9/1998 | Shimura |
| 5,835,405 | A | 11/1998 | Tsui et al. |
| 5,874,834 | A | 2/1999 | New |
| 5,889,788 | A | 3/1999 | Pressly et al. |
| 5,892,961 | A | 4/1999 | Trimberger |
| 5,914,902 | A | 6/1999 | Lawrence et al. |
| 5,933,023 | A | 8/1999 | Young |
| 5,970,254 | A | 10/1999 | Cooke et al. |
| 6,011,407 | A | 1/2000 | New |
| 6,020,755 | A | 2/2000 | Andrews et al. |
| 6,026,481 | A | 2/2000 | New et al. |
| 6,096,091 | A | 8/2000 | Hartmann |
| 6,154,051 | A | 11/2000 | Nguyen et al. |
| 6,163,166 | A | 12/2000 | Bielby et al. |
| 6,172,990 | B1 | 1/2001 | Deb et al. |
| 6,178,541 | B1 | 1/2001 | Joly et al. |
| 6,181,163 | B1 | 1/2001 | Agrawal et al. |
| 6,211,697 | B1 | 4/2001 | Lien et al. |
| 6,242,945 | B1 | 6/2001 | New |
| 6,272,451 | B1 | 8/2001 | Mason et al. |
| 6,279,045 | B1 | 8/2001 | Muthujumaraswathy et al. |
| 6,282,627 | B1 | 8/2001 | Wong et al. |
| 6,301,696 | B1 | 10/2001 | Lien et al. |
| 6,343,207 | B1 | 1/2002 | Hessel et al. |
| 6,353,331 | B1 | 3/2002 | Shimanek |
| 6,356,987 | B1 | 3/2002 | Aulas |
| 6,389,558 | B1 | 5/2002 | Herrmann et al. |
| 6,434,735 | B1 | 8/2002 | Watkins |
| 6,460,172 | B1 | 10/2002 | Insenser Farre et al. |
| 6,507,942 | B1 | 1/2003 | Calderone et al. |
| 6,510,548 | B1 | 1/2003 | Squires |
| 6,518,787 | B1 | 2/2003 | Allegrucci et al. |
| 6,519,753 | B1 | 2/2003 | Ang |
| 6,522,167 | B1 | 2/2003 | Ansari et al. |
| 6,532,572 | B1 | 3/2003 | Tetelbaum |
| 6,539,508 | B1 | 3/2003 | Patrie et al. |
| 6,541,991 | B1 | 4/2003 | Hornchek et al. |
| 6,587,995 | B1 | 7/2003 | Duboc et al. |
| 6,588,006 | B1 | 7/2003 | Watkins |
| 6,601,227 | B1 | 7/2003 | Trimberger |
| 6,604,228 | B1 | 8/2003 | Patel et al. |
| 6,611,951 | B1 | 8/2003 | Tetelbaum et al. |
| 6,650,140 | B1 * | 11/2003 | Lee et al. .................. 326/39 |
| 6,693,918 | B1 * | 2/2004 | Dallabetta et al. .......... 370/503 |
| 6,959,015 | B1 * | 10/2005 | Hwang et al. ............. 370/516 |
| 2001/0049813 | A1 | 12/2001 | Chan et al. |
| 2003/0062922 | A1 | 4/2003 | Douglass et al. |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |

OTHER PUBLICATIONS

U.S. Appl. No. 10/082,490, filed Feb. 22, 2002, Cory.

U.S. Appl. No. 10/660,449, filed Sep. 11, 2003, Cory et al.

U.S. Appl. No. 10/622,204, filed Jul. 18, 2003, Cory.

Sayfe Kiaei et al., "VLSI Design of Dynamically Reconfigurable Array Processor-DRAP," IEEE, Feb. 1989, pp. 2484-2488, V3.6, IEEE, 3 Park Avenue, 17th Floor, New York, NY 10016-5997.

Vason P. Srini, "Field Programmable Gate Array (FPGA) Implementation of Digital Systems: an Alternative to ASIC," IEEE, May 1991, pp. 309-314, IEEE, 3 Park Avenue, 17th Floor, New York, NY 10016-5997.

G. Maki et al., "A Reconfigurable Data Path Processor," IEEE, Aug. 1991, pp. 18-4.1 to 18-4.4, IEEE, 3 Park Avenue, 17th Floor, New York, NY 10016-5997

Jacob Davidson, "FPGA Implementation of Reconfigurable Microprocessor," IEEE, Mar. 1993, pp. 3.2.1-3.2.4, IEEE, 3 Park Avenue, 17th Floor, New York, NY 10016-5997.

Christian Iseli et al., "Beyond Superscaler Using FPGA's," IEEE, Apr. 1993, pp. 486-490, IEEE, 3 Park Avenue, 17th Floor, New York, NY 10016-5997.

P.C. French et al., "A Self-Reconfiguring Processor,"; IEEE, Jul. 1993, pp. 50-59, IEEE, 3 Park Avenue, 17th Floor, New York, NY 10016-5997.

Christian Iseli et al., "Spyder: A Reconfigurable VLIW Processor Using FPGA's," IEEE, Jul. 1993, pp. 17-24, IEEE, 3 Park Avenue, 17th Floor, New York, NY 10016-5997.

Michael J. Wirthlin et al., "The Nano Processor: a Low Resource Reconfigurable Processor," IEEE, Feb. 1994, pp. 23-30, IEEE, 3 Park Avenue, 17th Floor, New York, NY 10016-5997.

William S. Carter, "The Future of Programmable Logic and its Impact on Digital System Design," Apr. 1994, IEEE, pp. 10-16, IEEE, 3 Park Avenue, 17th Floor, New York, NY 10016-5997.

Andre' Dehon, "DPGA-Coupled Microprocessors: Commodity ICs for the Early 21st Century,"IEEE, Feb. 1994, pp. 31-39, IEEE, 3 Park Avenue, 17th Floor, New York, NY 10016-5997.

Osama T. Albaharna, "Area & Time Limitations of FPGA-Based Virtual Hardware," IEEE, Apr. 1994, pp. 184-189, IEEE, 3 Park Avenue, 17th Floor, New York, NY 10016-5997.

*Xilinx, Inc.*, "The Programmable Logic Data Book," 1994, Revised 1995, Xilinx, Inc., 2100 Logic Drive, San Jose, CA. 95124.

*Xilinx, Inc.*, "The Programmable Logic Data Book," 1994, Revised 1995, pp. 2-109 to 2-117, Xilinx, Inc., 2100 Logic Drive, San Jose, CA. 95124.

*Xilinx, Inc.*, "The Programmable Logic Data Book," 1994, Revised 1995, pp. 2-9 to 2-18, 2-187 to 2-199, Xilinx, Inc., 2100 Logic Drive, San Jose, CA. 95124.

*Xilinx, Inc.*, "The Programmable Logic Data Book," 1994, Revised 1995, pp. 2-107 to 2-108, Xilinx, Inc., 2100 Logic Drive, San Jose, CA. 95124.

Christian Iseli et al., "AC++ Compiler for FPGA Custom Execution Units Synthesis," 1995, pp. 173-179, IEEE, 3 Park Avenue, 17th Floor, New York, NY 10016-5997.

*International Business Machines*, "PowerPC 405 Embedded Processor Core User Manual," 1996, 5th Ed., pp. 1-1 to X-16, International Business Machines, 1580 Rout 52, Bldg. 504, Hopewell Junction, NY 12533-6531.

Yamin Li et al., "Aizup-a Pipelined Processor Design & Implementation on Xilinx FPGA Chip," IEEE, Sep. 1996, pp. 98-106, 98-106, IEEE, 3 Park Avenue, 17th Floor, New York, NY 10016-5997.

Ralph D. Wittig et al., OneChip: An FPGA Processor With Reconfigurable Logic, Apr. 17, 1996, pp. 126-135, IEEE, 3 Park Avenue, 17th Floor, New York, NY 10016-5997.

*Xilinx, Inc.*, "The Programmable Logic Data Book," Jan. 27, 1999, Ch. 3, pp. 3-1 to 3-50, Xilinx, Inc., 2100 Logic Drive, San Jose, CA 95124.

William B. Andrew et al., "A Field Programmable System Chip Which Combines FPGA & ASIC Circuitry," IEEE, May 16, 1999, pp. 183-186, IEEE, 3 Park Avenue, 17th Floor, New York, NY 10016-5997.

*Xilinx, Inc.*, "The Programmable Logic Data Book," 2000, Ch. 3 pp. 3-1 to 3-117, Xilinx, Inc., 2100 Logic Drive, San Jose, CA 95124.

*Xilinx, Inc.*, "The Programmable Logic Data Book," 2000, Ch 3 pp. 3-7 to 3-17; 3-76 to 3-87, Xilinx, Inc., 2100 Logic Drive, San Jose, CA. 95124.

*International Business Machines*, "Processor Local Bus"Architecture Specifications, 32-Bit Implementation, Apr. 2000, First Edition, V2.9, pp. 1-76, IBM Corporation, Department H83A, P.O. Box 12195, Research Triangle Park, NC 27709.

*Xilinx, Inc.*, Virtex II Platform FPGA Handbook, Dec. 6, 2000, v1.1, pp. 33-75, Xilinx, Inc., 2100 Logic Drive, San Jose, CA. 95124.

Cary D. Snyder et al., "Xilinx's A-to-Z System Platform," Cahners Microprocessor Report, Feb. 26, 2001, pp. 1-5, Microdesign Resources, www.MDRonline.com, 408-328-3900.

U.S. Appl. 09/858,732, filed May 15, 2001, Schulz.

U.S. Appl. 09/861,112, filed May 18, 2001, Dao et al.

U.S. Appl. 09/917,304, filed Jul. 27, 2001, Douglass et al.

* cited by examiner

FLEXIBLE CHANNEL BONDING AND CLOCK CORRECTION OPERATIONS ON A MULTI-BLOCK DATA PATH

BACKGROUND OF THE INVENTION

1. Field of the Invention

The invention relates to the field of digital communications, and more particularly, to an elastic buffer compatible with various communications protocols.

2. Related Art

In a serial transceiver (transmitter-receiver), separate clocks control the rates of data being received by and read from the receiver. Although nominally running at the same frequency, the recovered clock (derived from the received data) and the read clock typically differ in frequency by up to 200 ppm (parts per million). To accommodate this asynchronous behavior, the receiver in a serial transceiver frequently includes an "elastic buffer." An elastic buffer is a modified FIFO (first in first out) memory that compensates for frequency discrepancies between the recovered clock and the read clock in a serial transceiver. During normal operation, data is continuously written to and read from the elastic buffer by the recovered clock (i.e., the write clock of the elastic buffer) and read clock, respectively.

FIG. 1a shows a conventional elastic buffer 100, which comprises a controller 110 and a memory array 120. Memory array 120 includes a plurality of equally sized memory locations A00–A63, each holding one "block" of data (i.e., the smallest grouping of data bits in a data stream—a byte, for example). Controller 110 receives an input data stream Din, a write (recovered) clock signal Wclk, and a read clock signal Rclk. Input data stream Din is formed by a series of data blocks, wherein the width of each data block is dependent on the particular communications protocol being used. When write clock signal Wclk is driven HIGH, controller 110 generates a write address Waddr corresponding to one of memory locations A00–A63, and the first available data block of input data stream Din is written into that memory location. The next time write clock signal Wclk is driven HIGH, controller 110 increments write address Waddr, so that consecutive data blocks from input data stream Din are stored in contiguous (i.e., sequential) memory locations in memory array 120. Note that in a FIFO such as elastic buffer 100, the last memory location (A63) in memory array 120 is treated as being contiguous with the first memory location (A00). Therefore, after a data block is written to memory location A63, the next write operation is to memory location A00. Note that while a memory location is contiguous with the memory locations that immediately precede and immediately follow it, the memory location is not contiguous with itself.

In a similar manner, during read operations to memory array 120, a positive edge on read clock signal Rclk causes controller 110 to generate a read address Raddr that corresponds to one of memory locations A00–A63, and the data block stored in that memory location is read out. During normal read operations, each positive edge on read clock signal Rclk increments read address Raddr so that the contents of contiguous memory locations are read as an output data stream Dout. As noted previously, memory location A63 is treated as being contiguous with memory location A00.

A "half full" configuration (i.e., half of memory locations A00–A63 are storing buffered data not yet read) gives elastic buffer 100 the greatest cushion for variations in write and read clock rates. However, because write clock signal Wclk and read clock signal Rclk typically run at different frequencies, this half full configuration cannot be sustained indefinitely. For example, if write clock wclk is faster than read clock Rclk, memory array 120 will "fill up" with unread data blocks. Eventually, new data blocks from input data stream Din will overwrite already-stored data blocks in memory array 120 before those older data blocks can be read out (overflow state). If write clock Wclk is slower than read clock Rclk, memory array 120 will be "emptied" as read operations take place faster than new data blocks can be stored. In such a case, a data block in a particular memory location may be read out multiple times before a new data block is stored in that memory location (underflow state).

To compensate for these read and write clock frequency discrepancies, elastic buffer 100 can execute "clock correction" operations (sometimes referred to as "rate matching" operations), in which special data blocks originally included in input data stream Din are omitted from output data stream Dout, or else special data blocks not originally present in input data stream Din are added to output data stream Dout. A "correction sequence" can be defined as the smallest set of data blocks, or "correction blocks," that may be omitted or added for clock correction operations. The correction (omission or addition) takes place at a location within the data stream where the correction sequence is (or was) present. The particular communications protocol being used defines the length (number of blocks, greater than or equal to one) of the correction sequence, as well as the values of the blocks in the correction sequence. Correction sequences are typically present at various locations within input data stream Din. The associated communications protocol is designed to ignore the presence or absence of such correction sequences during processing of a data stream. Therefore, controller 110 can monitor input data stream Din for these correction sequences and use them to execute clock correction operations when memory array 120 approaches an overflow or underflow state, without affecting the information being carried by data stream Din (or Dout).

As an example, assume that input data stream Din is made up of consecutive data blocks d0, d1, X, d3, d4, d5, d6, X, d8, etc., where X is a correction sequence consisting of a single correction block. At each positive edge on write clock signal Wclk, a data block is written into memory array 120—e.g., data block d0 is written into memory location A00, data block d1 is written into memory location A01, correction block X is written into memory location A02, and so forth. Then, if memory array 120 were getting too full (i.e., if an overflow state were being approached), controller 110 could generate a read address Raddr that jumped from memory location A01 to memory location A03, thereby skipping the readout of correction block X. This type of "accelerating clock correction" effectively speeds up the reading of actual data to compensate for the slower read clock signal Rclk. Similarly, if memory array 120 were getting too empty (i.e., if an underflow state were being approached), controller 110 could simply repeat (i.e., not increment) read address Raddr when a memory location holding a correction block were reached. This type of "delaying clock correction" effectively slows down the faster read operations until sufficient new data blocks can be written into memory array 120.

Commonly, multiple transceivers, each with its own elastic buffer, may be operating in parallel to increase overall data throughput. The input data stream is broken into discrete data blocks and those data blocks pass through the parallel transceivers as an aggregate data stream. For example, FIG. 1b shows elastic buffers 100a and 100b in two transceivers configured to act as two "channels" for an input data stream Din. Elastic buffers 100a and 100b are substantially similar to elastic buffer 100 shown in FIG. 1a. Input data stream Din is split into two partial data streams Din_a and Din_b by feeding alternating data blocks from input data stream Din into each partial data stream. On every positive edge on write clock signal Wclk_a, a data block from partial data stream Din_a is sent to elastic buffer 100a and stored in memory array 120a at write address Waddr_a. Similarly, on each positive edge on write clock signal Wclk_b (which runs at the same frequency as write clock signal Wclk_a), a block from partial data stream Din_b is sent to elastic buffer 100b and is stored in memory array 120b at write address Waddr_b. Therefore, on each write clock cycle, two sequential data blocks from input data stream Din are stored.

Similarly, on every positive edge on read clock signals Rclk_a and Rclk_b (which are equal), two data blocks are read—one from read address Raddr_a in memory array 120a (as part of partial data stream Dout_a) and one from read address Raddr_b in memory array 120b (as part of partial data stream Dout_b). These two data blocks are reassembled into sequential data blocks in output data stream Dout. The use of two transceivers in parallel in this way doubles the data throughput compared with a single transceiver. For example, assume that input data stream is made up of consecutive data blocks da0, db0, da1, db1, da2, db2, da3, db3, etc. Ideally, the data stored in memory arrays 120a and 120b would be arranged as shown in Table 1.

TABLE 1

ALIGNED MULTI-CHANNEL DATA

| 120a | 120b |
|---|---|
| A00: da0 | B00: db0 |
| A01: da1 | B01: db1 |
| A02: da2 | B02: db2 |
| A03: da3 | B03: db3 |
| . | . |
| . | . |
| . | . |

Each read operation would read out the appropriate pair of data blocks—i.e., (da0 db0), (da1 db1), (da2 db2), (da3 db3), etc. Output data stream Dout would then be properly reassembled. Unfortunately, unequal transmission delays on the two channels and other effects can cause the data blocks stored in memory arrays 120a and 120b to be skewed significantly with respect to each other; i.e., the data blocks stored in memory array 120a may be offset (misaligned) from their corresponding data blocks stored in memory array 120b, as shown, for example, in Table 2.

TABLE 2

MISALIGNED MULTI-CHANNEL DATA

| 120a | 120b |
|---|---|
| A00: da0 | B00: db1 |
| A01: da1 | B01: db2 |
| A02: da2 | B02: db3 |
| A03: da3 | B03: db4 |
| . | . |
| . | . |
| . | . |

In this case, each read operation would read out mismatched pairs of data blocks—i.e., (da0 db1), (da1 db2), (da2 db3), (da3 db4), etc. Output data stream Dout would then no longer be an accurate recreation of input data stream Din. To provide a means for correcting this problem, partial input data streams Din_a and Din_b will typically include special "alignment sequences" consisting of one or more "alignment blocks" that define corresponding points in the separate channels. As with the aforementioned correction sequences, the length of an alignment sequence and the values of the alignment blocks are defined by the particular communications protocol being used. These predefined alignment sequences can therefore be used to correlate the data blocks stored in different elastic buffers. For clarity, the invention will be discussed with respect to alignment sequences consisting of a single data block. Note, however, that the same principles apply to alignment sequences including multiple data blocks, as the position of the leading data block in such a multi-block alignment sequence would determine the manner in which an associated alignment operation would be carried out.

For example, suppose that input data stream Din is made up of data blocks da0, db0, DA, DB, da1, db1, da2, db2, etc., where data blocks DA and DB represent alignment blocks. Table 3 shows a possible data misalignment that could result from such an input data stream.

TABLE 3

MISALIGNED MULTI-CHANNEL DATA WITH ALIGNMENT DATA BLOCKS

| 120a | 120b |
|---|---|
| A00: da0 | B00: DB |
| A01: DA | B01: db1 |
| A02: da1 | B02: db2 |
| A03: da2 | B03: db3 |
| . | . |
| . | . |
| . | . |

As with the misaligned data shown in Table 2, simply reading out the stored data depicted in Table 3 would result in a corrupted output data stream Dout. However, during normal operation of elastic buffers 100a and 100b, controllers 110a and 110b monitor partial input data streams Din_a and Din_b, respectively, and record the memory locations in which alignment blocks DA and DB, respectively, are stored. Alignment blocks DA and DB can then be used to perform a "channel bonding" (or "channel alignment") operation to realign the stored data to generate output data stream Dout.

To perform a channel bonding operation, one of the elastic buffers is designated the master elastic buffer (in this case elastic buffer 100a), and all channel bonding operations are initiated by the master. Typically, the master elastic buffer (elastic buffer 100a) asserts a channel bonding signal CB_load a specified wait period ("channel bonding wait") after alignment block DA is read out of memory array 120a. The channel bonding wait is a fixed number of data blocks that must be read, starting with the alignment block, before performing a channel bonding operation. The wait period gives each slave elastic buffer time to store the corresponding alignment block from its partial input data stream and establish the location of that alignment block as the current reference point for alignment. In response to channel bonding signal CB_load, each elastic buffer sets its read address to point to the memory location of its stored alignment block (or a memory location having a defined position relative to the memory location of the alignment block). For example, elastic buffer 100a sets read address Raddr_a to the address corresponding to the memory location (A01) in memory array 120a of alignment block DA, while elastic buffer 100b (the slave) sets read address Raddr_b to the address corresponding to the memory location (B00) in memory array 120b of alignment block DB. By matching up alignment blocks DA and DB in this manner, the channel bonding operation (sometimes referred to as "channel alignment") forces subsequent read operations to read out properly matched data blocks from memory arrays 120a and 120b. Note that to maintain this data alignment, the master elastic buffer (100a) must also control the clock correction operations described previously for all the slave elastic buffers (100b).

The design and manufacture of the elastic buffer circuitry can be greatly simplified if the required clock speeds for writing and reading the elastic buffer can be reduced. One way to do this is to increase the buffer's width—i.e., the number of data blocks written or read per clock cycle. FIG. 1c shows a conventional elastic buffer 100c that is substantially similar to elastic buffer 100 shown in FIG. 1a, except that the memory locations in memory array 160 are addressed in two-block increments. Therefore, with each pulse of write clock signal Wclk, controller 110c generates a write address Waddr that corresponds to two adjacent memory locations in memory array 160, and two consecutive data blocks from input data stream Din are written into the designated memory locations. Similarly, a positive edge on read clock signal Rclk causes controller 110c to generate a read address Raddr that corresponds to two adjacent memory locations, and two stored data blocks are read out as part of output data stream Dout. Because multiple data blocks are written and read from elastic buffer 100c during each write or read cycle, respectively, elastic buffer 100c can be referred to as a "multi-block width" elastic buffer. Specifically, memory array 160 has a width of two data blocks, making it twice as wide as memory array 120 of elastic buffer 100.

By writing and reading multiple data blocks on each clock pulse, a multi-block width elastic buffer can significantly increase data throughput over a elastic buffer that only writes or reads a single data block per clock cycle. For example, assume that input data stream Din is made up of consecutive data blocks da0, db0, da1, db1, da2, db2, da3, db3, etc. In response to a positive edge on write clock Wclk, controller 110c would generate a write address Waddr corresponding to, for example, memory locations A00 and B00. Data block da0 would then be stored in memory location A00, and data block db0 would be stored in memory location B00. On the next rising edge of write clock Wclk, data block da1 would be stored in memory location A01 and data block db1 would be stored in memory location B01. Each subsequent write operation would store two more data blocks from input data stream Din. In a similar manner, each positive edge on read clock signal Rclk reads out the data blocks stored in two adjacent memory locations. Therefore, elastic buffer 100c has twice the data throughput of elastic buffer 100 shown in FIG. 1a, and therefore can operate at half the clock speed, thereby decreasing design and manufacturing complexity.

However, because each write address Waddr and read address Raddr generated by controller 110c corresponds to a memory location having a multi-block width, elastic buffer 100c requires that any correction sequence in input data stream Din must be "full width"—i.e., the correction sequence must occupy the full width of memory array 160. This limitation can make an increased-width elastic buffer, such as elastic buffer 100c, incompatible with communications protocols that incorporate correction sequences having lengths that are not integral multiples of the elastic buffer width. For example, some modern high-speed communications protocols, such as XAUI (10 gigabit extended Attachment Unit Interface), use a one-byte correction sequence. Each time such a one-byte correction sequence is written into a memory location in memory array 160, a non-correction data block (byte) could be written into an adjacent memory location (assuming that elastic buffer 100c has a width of two bytes). A clock correction operation using that correction block would then either delete the adjacent data block or add copies of the adjacent data block to the output data stream.

In addition to requiring that the correction sequence length match the elastic buffer width, correct operation of the elastic buffer would also require that a single correction sequence be properly aligned within memory array 160. Assume for example that the correction sequence length and elastic buffer width both are two data blocks. Suppose that input data stream Din is made up of consecutive data blocks da1, X1, X2, and db2, where data blocks X1 and X2 represent a correction sequence. Further suppose data blocks da1, X1, X2, and db2 are written into memory locations A00, B00, A01, and B01, respectively. The correction sequence (X1 X2) occupies memory locations (B00 and A01, respectively) addressed by two different values of read address Raddr, and there is no way to manipulate read address Raddr to effect clock correction. Skipping or repeating an address will always cause the spurious omission or insertion of either data block da1 or data block db2.

A similar issue arises when elastic buffers having multi-block widths are used in a multi-channel configuration. FIG. 1d shows elastic buffers 100d and 100e in two transceivers configured to act as two channels for an input data stream Din. Elastic buffers 100d and 100e are substantially similar to elastic buffer 100c shown in FIG. 1c, each having a width of two data blocks. Therefore, input data stream Din is split into two partial data streams Din_d and Din_e by feeding alternating pairs of data blocks from input data stream Din into each partial data stream. On every positive edge on write clock signal Wclk_d, two data blocks from partial data stream Din_d are sent to elastic buffer 100d and stored in memory array 160d at write address Waddr_d. Similarly, on each positive edge on write clock signal Wclk_e (which runs at the same frequency as write clock signal Wclk_d), two data blocks from partial data stream Din_e are sent to elastic buffer 100e and are stored in memory array 160e at write address Waddr_e. Therefore, on each write clock cycle, four sequential data blocks from input data stream Din are stored. For example, assume that partial input data stream Din_d includes data blocks d1, d2, DD, d3, d4, d5, while partial input data stream Din_e includes the data blocks e1, e2, DE, e3, e4, e5, where DD and DE are the alignment blocks. Assume further that due to misalignment of data between the channels, memory arrays 160d and 160e are written according to Table 4.

TABLE 4

MISALIGNED MULTI-CHANNEL DATA IN MULTI-BLOCK WIDTH ELASTIC BUFFERS

| 160d | 160e |
|---|---|
| A00: d1 | C00: — |
| B00: d2 | D00: e1 |
| A01: DD | C01: e2 |
| B01: d3 | D01: DE |

TABLE 4-continued

MISALIGNED MULTI-CHANNEL DATA IN MULTI-BLOCK WIDTH ELASTIC BUFFERS

| 160d | 160e |
|---|---|
| A02: d4 | C02: e3 |
| B02: d5 | D02: e4 |
| . | C03: e5 |
| . | D03: — |
| . | . |
| | . |
| | . |

Because the data stored in memory arrays 160d and 160e can only be addressed in specific two-block increments, output data stream Dout cannot be placed in proper alignment. At some positive edge of read clock signal Rclk_d, data blocks d4 and d5 will be written to partial output data stream Dout_d. At the same positive edge of read clock signal Rclk_e, data blocks e4 and e5 should be written to partial output data stream Dout_e, but no value of read address Raddr_e can cause these two blocks to be written out together.

Use of a multi-block width elastic buffer may be desirable to simplify the buffer design by reduction of the clock speeds. At the same time, it may be required that a transceiver (including the elastic buffer) support a variety of communications protocols. This is particularly desirable, for example, for transceivers that are to be embedded in a programmable logic device such as a field-programmable gate array (FPGA), which is intended to be configurable for a broad range of applications. However, as described above, existing multi-block width elastic buffers are limited to protocols having correction sequence lengths matching the width of the buffer(s), and for which clock correction and channel alignment operations are properly timed to prevent unachievable data block sequences on output data stream Dout. Accordingly, it is desirable to provide an elastic buffer having a multi-block width that overcomes these limitations.

SUMMARY

The invention provides an elastic buffer for buffering an input data stream of data blocks, where multiple data blocks can be written and read during each write and read clock cycle, respectively. The elastic buffer controller uses multiple read addresses, allowing access to independently addressable (and therefore non-contiguous, when desired) memory locations during each read cycle. By using a FIFO having independently addressable read memory locations in the memory space of the elastic buffer, the elastic buffer can advantageously perform clock correction and channel bonding operations on data streams that do not provide full-width correction block sequences and/or do not constrain the timing of correction and channel bonding operations. According to another embodiment of the invention, the memory locations in the memory space are arranged in multiple identical memory arrays, each having a single read port, wherein the input data blocks are written to the same location in each of the identical memory arrays.

An elastic buffer in accordance with an embodiment of the invention includes a controller and a memory space. The memory space includes multiple memory locations, with each addressable location holding a single data block from the data stream to be buffered. According to an embodiment of the invention, the memory locations in the memory space are arranged in a single memory array with multiple read ports. On every write clock pulse, the controller writes a specified quantity of data blocks into the same number of contiguous memory locations in the memory space. During normal read operations, the controller reads out the same quantity of data blocks from a set of contiguous memory locations in the memory space.

During clock correction operations, the elastic buffer either skips or repeats correction blocks to accelerate or delay, respectively, the effective readout of data blocks from its memory space. Because the read cycle uses multiple read addresses that may be individually manipulated, a full width correction sequence (i.e., a correction sequence that has the same width as the memory space) is not required. By adjusting the read addresses used to address the memory space by the appropriate correction increment and properly timing the correction for the multiple read addresses, any desired acceleration or delay can be implemented.

Adjustments to the multiple read addresses during clock correction operations ("clock correction adjustments") may be applied during a single read clock cycle, or the adjustments may be applied in consecutive read clock cycles. According to an embodiment of the invention, a "stagger" indicator can provide this timing information and also reduce the number of control signals used to operate the elastic buffer. The stagger indicator specifies whether or not the clock correction operation is to be performed in one or two clock cycles and can also indicate the particular read clock cycle in which a specific read address is to be adjusted (for two-cycle clock correction operations). According to an embodiment of the invention, if the width of the memory space in an elastic buffer is two data blocks and the stagger indicator is in an inactive state, both read addresses are incremented by the appropriate clock correction increment during a single read clock cycle. If the stagger indicator is in an active state for the same elastic buffer, one of the read addresses is incremented by the clock correction increment during a first read clock cycle, and the other read address is incremented by the clock correction increment during the next read clock cycle. According to an embodiment of the invention, the stagger indicator can be generated by a single bit.

The elastic buffer can be operated in parallel with other elastic buffers (in separate transceivers) in a multi-channel configuration, beneficially combining the throughput enhancements of a multi-block width elastic buffer and a multi-channel configuration. The input data stream is divided into separate partial data streams, each of which is received by a separate transceiver and stored in one of the elastic buffers. The data stored in the several elastic buffers are read out in an aggregate manner and recombined into an output data stream. To maintain data consistency between the input data stream and the output data stream, channel bonding operations can be performed to ensure that the data blocks read from the elastic buffers are properly aligned.

To enable channel bonding capability, one of the elastic buffers is designated the master elastic buffer and controls the channel bonding operations. The master elastic buffer also must control all clock correction operations for the group of elastic buffers so that data alignment is maintained. Because the read cycle for each elastic buffer uses multiple, individually controlled read addresses, the timing of channel bonding operations is much less constrained than would be the case with conventional elastic buffers. Just as with clock correction operations, a channel alignment may occur during a single read clock cycle, or it may be split across consecutive read clock cycles. The stagger indicator can again be used to control the timing of the channel alignments.

The present invention will be more fully understood in view of the following description and drawings.

BRIEF DESCRIPTION OF THE DRAWINGS

FIG. 1b shows a diagram of a multi-channel elastic buffer configuration, using conventional elastic buffers of the type in FIG. 1a.

DETAILED DESCRIPTION

Figure 2A:
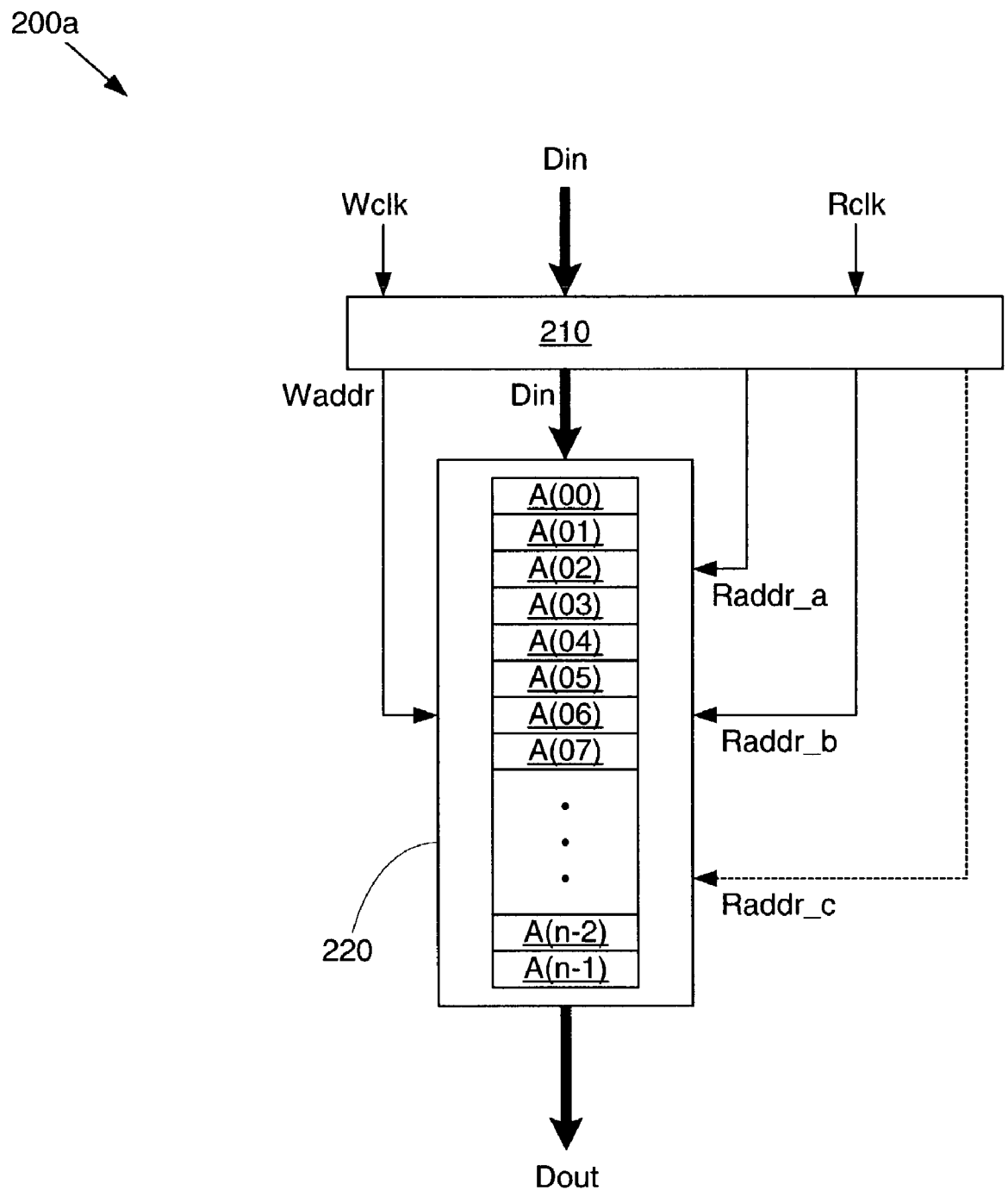
FIG. 2a shows a diagram of an elastic buffer having a multi-block width with multiple read addresses, allowing each block to be addressed independently for reading, according to an embodiment of the invention.

FIG. 2a shows an elastic buffer 200a, in accordance with an embodiment of the invention. Elastic buffer 200a is configured to buffer an input data stream Din, where input data stream Din is made up of a series of equally-sized data blocks. Note that invention can accommodate data blocks having any size (number of bits), and therefore is not limited to any particular data block format. Accordingly, input data stream Din can comprise any type of data stream, such as a 10 gigabit extended Attachment Unit Interface (XAUI) data stream, an InfiniBand data stream, a Gigabit Ethernet data stream, or a Fibre Channel data stream. Elastic buffer 200a comprises a controller 210 and a memory space 220. Memory space 220 includes a plurality of memory locations A(00) to A(n-1). Each of memory locations A(00) to A(n-1) has the same width as the data blocks forming input data stream Din and is individually addressable during read operations to memory space 220.

Controller 210 is configured to receive input data stream Din, a write clock signal Wclk, and a read clock signal Rclk. In response to an active edge on write clock signal Wclk, controller 210 generates a write address Waddr that corresponds to a plurality of contiguous memory locations in memory space 220. Note that either a positive (rising) edge or a negative (falling) edge could be selected as the active edge for write clock signal Wclk (and read clock signal Rclk). Controller 210 passes input data stream Din to memory space 220, and the first available data blocks are written into the contiguous memory locations designated by write address Waddr. Note that write address Waddr would typically be a single address designating a sequence of contiguous memory locations, although write address Waddr could also comprise multiple addresses, each pointing to one of a sequence of contiguous memory locations.

For explanatory purposes, elastic buffer 200a will be described as writing and reading two data blocks per write and read clock cycle, respectively, although it will be noted that any number of data blocks could be written and read in each write and read clock cycle, respectively. Because two data blocks are written and read during each write and read clock cycle, respectively, elastic buffer 200a is considered to have a width of two data blocks. During write operations to elastic buffer 200a, if input data stream Din is made up of consecutive data blocks a, b, c, d, and so forth, a first active edge on write clock signal Wclk could cause data blocks a and b to be written into memory locations A(00) and A(01), respectively. In response to the next active edge on write clock signal Wclk, controller 210 would increment write address Waddr so that data blocks c and d would be written into memory locations A(02) and A(03). Let an "address unit" denote the difference between the addresses of contiguous memory locations in memory space 220. Then, for example, address A(01) would be equal to address A(00) plus one address unit. This relationship can be represented by the formula:

$$A(01)=A(00)+1$$

Note further that in a FIFO such as an elastic buffer, the last memory location (memory location A(n-1) in this embodiment) in memory space 220 is considered to be contiguous with the first memory location (memory location A(00)). This relationship can be represented by the formula:

$$A(00)=A(n-1)+1$$

where n is the total number of addressable memory locations in the memory space 220. Therefore, after a write clock cycle in which data blocks are written to memory locations A(n-2) and A(n-1), controller 210 would "wrap around" write address Waddr to correspond to memory locations A(00) and A(01).

In response to an active edge on read clock signal Rclk, controller 210 generates read addresses Raddr_a and Raddr_b, each corresponding to one of memory locations A(00) through A(n-1). Note that while only two read addresses are required to describe the invention with respect to the exemplary elastic buffer width of two data blocks, according to other embodiments of the invention any number of read addresses could be generated in response to read clock signal Rclk, as indicated by an optional read address Raddr_c. During normal read operations (i.e., when clock correction and channel alignment are not occurring), read addresses Raddr_a and Raddr_b correspond to contiguous memory locations in memory space 220. Furthermore, during each read clock cycle, the data block read out by read address Raddr_a is placed earlier in the output data stream than the data block read out by read address Raddr_b. Read address Raddr_a can therefore be designated the "leading" read address, while read address Raddr_b can be designated the "trailing" read address. During normal read operations, the relationship between read addresses Raddr_a and Raddr_b is represented by the formula:

$$Raddr\_b = Raddr\_a+1$$

During a normal read operation, read addresses Raddr_a and Raddr_b may denote memory locations that were written during a single write operation; i.e., if memory locations A(00) and A(01) were written during a single write operation, read addresses Raddr_a and Raddr_b could address memory locations A(00) and A(01), respectively, during a single read operation. However, it is also possible that, for example, if memory locations A(00) and A(01) were written during a single write operation, read addresses Raddr_a and Raddr_b could address memory locations A(01) and A(02), respectively, during a single read operation. Such varying alignments of read addresses Raddr_a and Raddr_b may occur as a result of clock correction operations and channel bonding operations as discussed below. In either case, read address Raddr_a is still designated the "leading" read address as noted above.

During normal read operations, a first active edge on read clock signal Rclk might generate read addresses Raddr_a and Raddr_b corresponding to memory locations A(00) and A(01), respectively. On the next active edge of read clock signal Rclk, read addresses Raddr_a and Raddr_b would be incremented to correspond to memory locations A(02) and A(03), respectively. Note that for each read clock cycle during normal read operations, both read addresses Raddr_a and Raddr_b are incremented by a standard read increment equal to the number of blocks that are read in each read clock cycle (two address units in the present example). In this manner, the data blocks stored in memory space 220 would be sequentially read out as output data stream Dout.

Figure 1A:
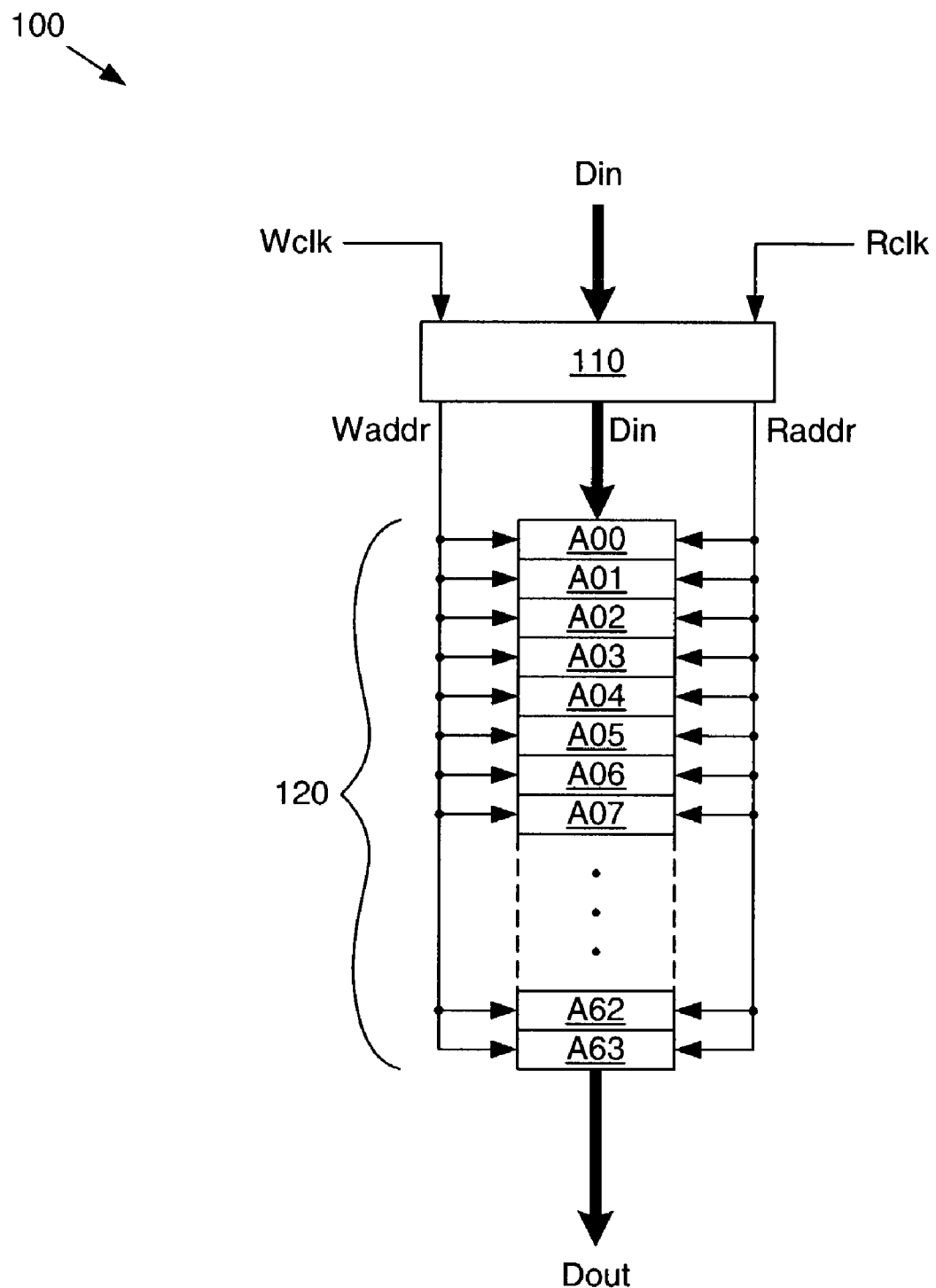
FIG. 1a shows a diagram of a conventional elastic buffer in which each addressable location holds a single block.
Figure 1B:
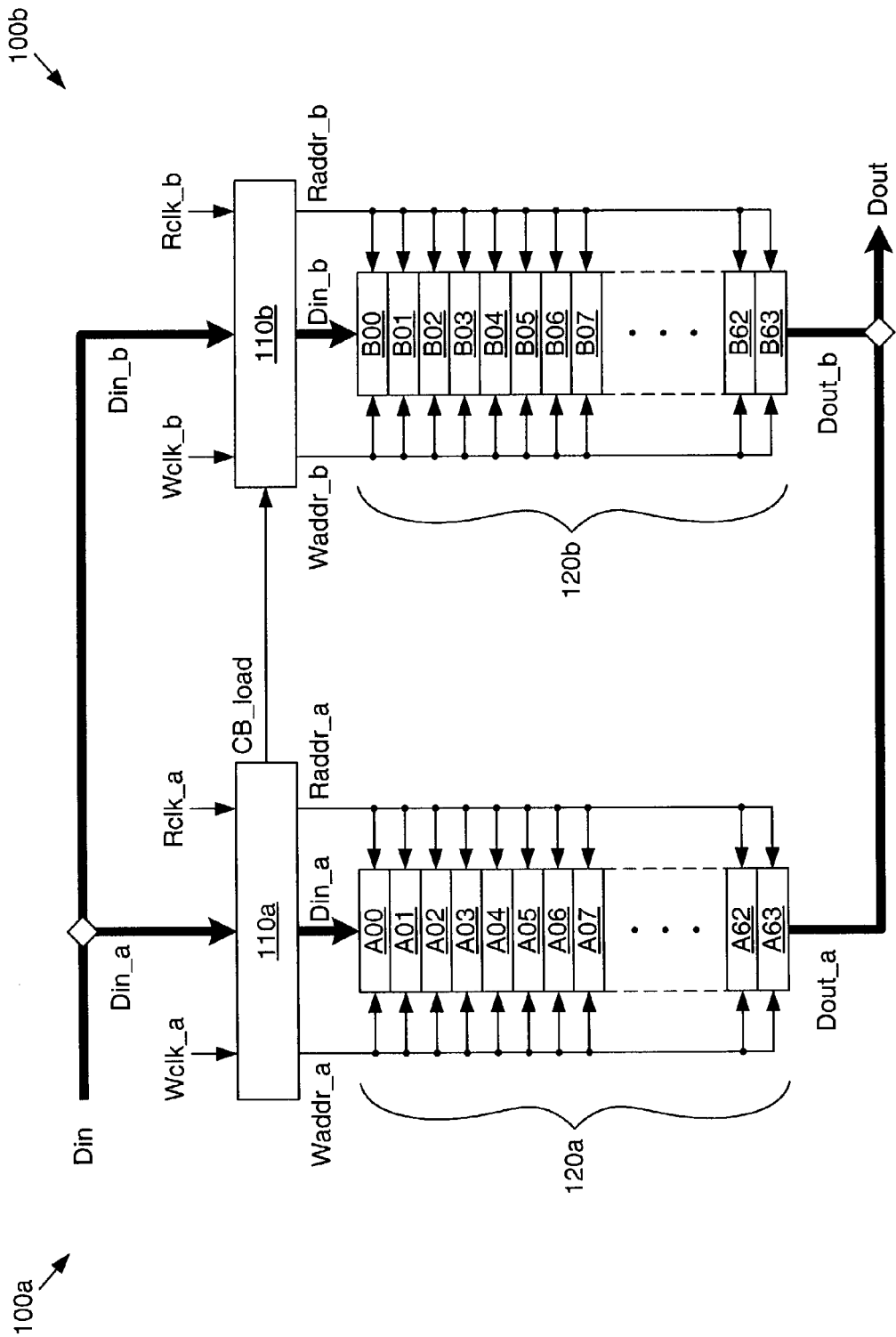
Figure 1C:
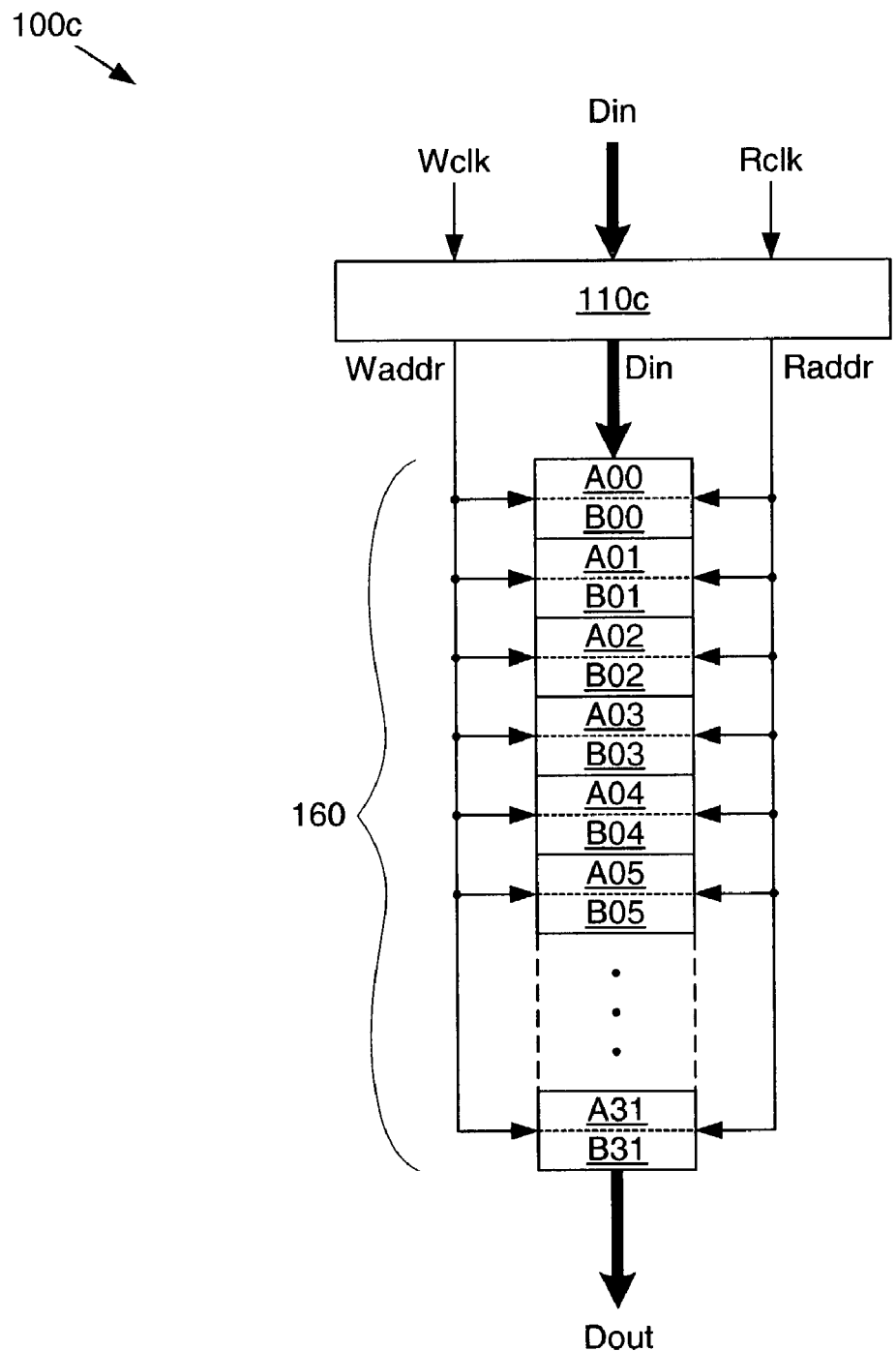
FIG. 1c shows a diagram of a conventional elastic buffer having a multi-block width.
Figure 1D:
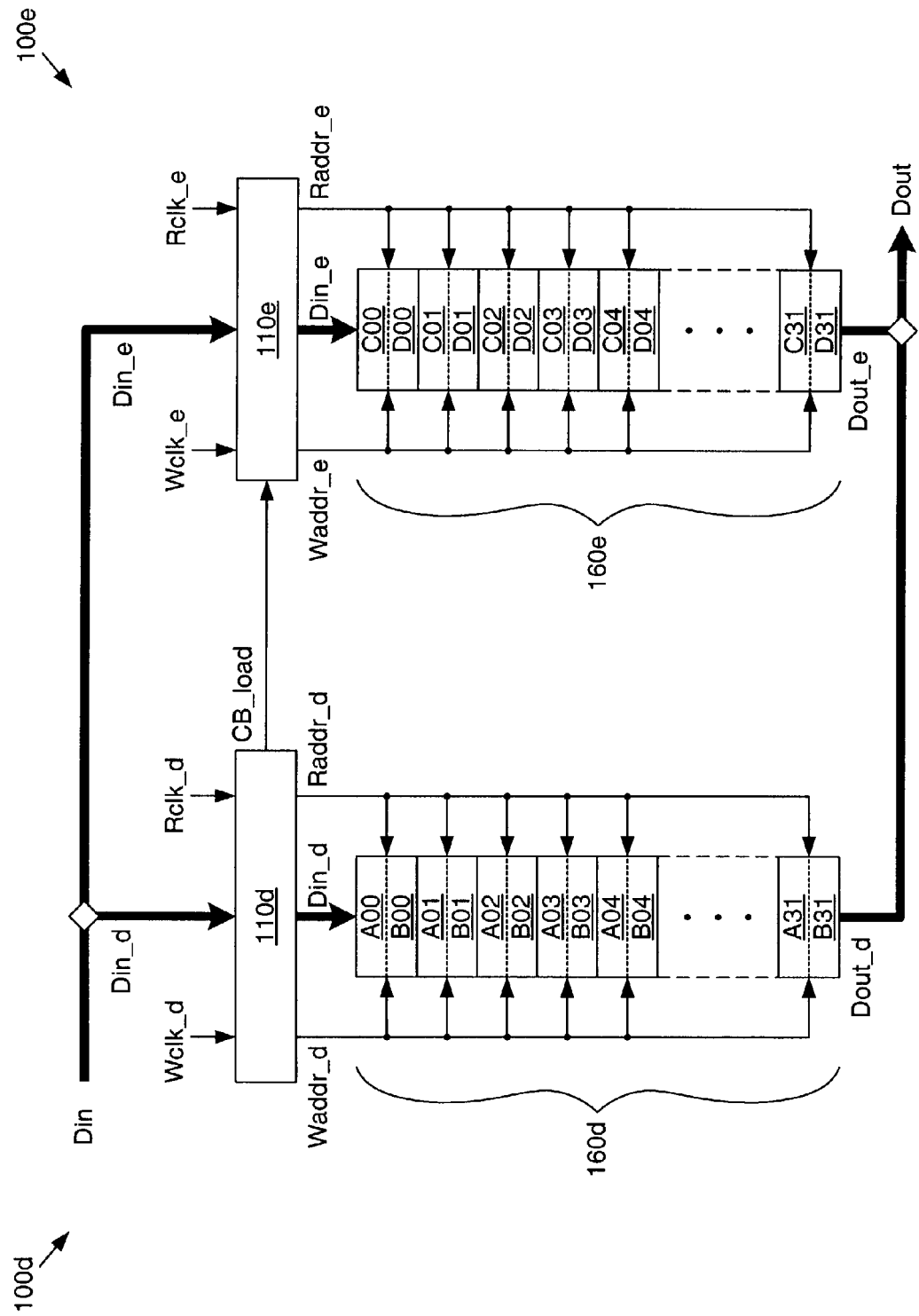
FIG. 1d shows a diagram of a multi-channel elastic buffer configuration, using conventional multi-block width elastic buffers.

However, read addresses Raddr_a and Raddr_b are not limited to contiguous memory locations, so that unlike conventional multi-block width elastic buffers (such as elastic buffer 100c shown in FIG. 1c), any stored data blocks can be read out of memory space 220 during a read operation. Therefore, elastic buffer 200a can perform correction operations on data streams having any size correction sequence, including correction sequences that do not occupy the full width of memory space 220 or are not written to memory space 220 in a single clock cycle.

For example, assume that input data stream Din is made up of data blocks a, b, X1, X2, c, d, e, f, and so forth, where data blocks X1 and X2 constitute a two-block correction sequence. A first active edge on write clock signal Wclk writes data blocks a and b into memory locations A(00) and A(01), respectively. The next active edge on write clock signal Wclk writes correction blocks X1 and X2 into memory locations A(02) and A(03), respectively; the following active edge on write clock signal Wclk writes data blocks c and d into memory locations A(04) and A(05), respectively; and the next active edge on write clock signal Wclk writes data blocks e and f into memory locations A(06) and A(07), respectively. The correction sequence formed by correction blocks X1 and X2 can be designated a "full width" correction sequence since the sequence occupies the full width of elastic buffer 200a. This data block storage arrangement is represented in Table 5, below.

TABLE 5

FULL WIDTH CORRECTION SEQUENCE

A(00): a
A(01): b
A(02): X1
A(03): X2
A(04): c
A(05): d
A(06): e
A(07): f
.
.
.

As described previously, during normal read operations, controller 210 increments read addresses Raddr_a and Raddr_b by the standard read increment (two) for each active edge on read clock signal Rclk—e.g., read address Raddr_a goes from memory location A(00) to memory location A(02) to memory location A(04) to memory location A(06), while read address Raddr_b goes from memory location A(01) to memory location A(03) to memory location A(05) to memory location A(07). To perform a clock correction operation, read addresses Raddr_a and Raddr_b must be incremented by a special "clock correction increment" that allows correction blocks X1 and X2 to be either skipped or repeated. For example, for an accelerating clock correction operation, Table 6 shows the desired sequence of read addresses Raddr_a and Raddr_b for bypassing memory locations A(02) and A(03).

TABLE 6

FULL-WIDTH ACCELERATING CLOCK CORRECTION

| Read Clock Cycle | Raddr_a | Raddr_a Increment | Raddr_b | Raddr_b Increment |
|---|---|---|---|---|
| (1) | A(00) | — | A(01) | — |
| (2) | A(04) | 4* | A(05) | 4* |
| (3) | A(06) | 2 | A(07) | 2 |

*nonstandard read increment

In read clock cycle (2) (i.e., the second cycle of read clock signal Rclk), elastic buffer 200 increments read addresses Raddr_a and Raddr_b by a clock correction increment of four (rather than the standard read increment of two), bypassing memory locations A(02) and A(03). For a delaying clock correction operation, Table 7 shows a sequence of read addresses Raddr_a and Raddr_b that repeat memory locations A(02) and A(03).

TABLE 7

FULL-WIDTH DELAYING CLOCK CORRECTION

| Read Clock Cycle | Raddr_a | Raddr_a Increment | Raddr_b | Raddr_b Increment |
|---|---|---|---|---|
| (1) | A(00) | — | A(01) | — |
| (2) | A(02) | 2 | A(03) | 2 |
| (3) | A(02) | 0* | A(03) | 0* |
| (4) | A(04) | 2 | A(05) | 2 |
| (5) | A(06) | 2 | A(07) | 2 |

*nonstandard read increment

In read clock cycle (3) shown in Table 7, the elastic buffer increments read addresses Raddr_a and Raddr_b by a clock correction increment of zero (rather than the standard read increment of two), repeating memory locations A(02) and A(03). After either type of clock correction operation, normal read operations can be resumed by applying the standard read increment to read addresses Raddr_a and Raddr_b during subsequent read clock cycles. Note that the total length of the delaying clock correction operation can be increased simply by applying the clock correction increment of zero (which can be referred to as a "static read increment") to read addresses Raddr_a and Raddr_b for a desired number of read clock cycles after read clock cycle (3) shown in Table 7 (instead of immediately applying the standard read increment of two as shown in read clock cycle (4)). In this manner, elastic buffer 200a can perform clock correction operations on an input data stream Din that includes full-width correction block sequences.

However, as noted previously, because read addresses Raddr_a and Raddr_b can be independently assigned, elastic buffer 200a can also accommodate correction blocks sequences that are not full width. For example, input data stream Din could be made up of sequential data blocks a, b, c, d, X, e, f, g, and so on, where data block X is a correction block. A first active edge on write clock signal Wclk (the first write clock cycle) writes data blocks a and b into memory locations A(00) and A(01), respectively. The next active edge on write clock signal Wclk (second write clock cycle) writes data blocks c and d into memory locations A(02) and A(03), respectively; the third write clock cycle writes correction block X and data block e into memory locations A(04) and A(05), respectively; and the fourth write clock cycle writes data blocks f and g into memory locations A(06) and A(07), respectively. This data block storage arrangement is represented in Table 8, below.

TABLE 8

NON-FULL WIDTH CORRECTION BLOCKS

A(00): a
A(01): b
A(02): c
A(03): d
A(04): X
A(05): e
A(06): f
A(07): g
.
.
.

Consider first the execution of accelerating and delaying clock corrections in the case where Raddr_a and Raddr_b address memory locations A(00) and A(01) during a first read cycle. Table 9 shows the desired sequence of read addresses Raddr_a and Raddr_b to perform an accelerating clock correction operation, skipping the correction block X in memory location A(04).

TABLE 9

LEADING ADDRESS ADJUSTMENT FOR ACCELERATING CLOCK CORRECTION

| Read Clock Cycle | Raddr_a | Raddr_a Increment | Raddr_b | Raddr_b Increment |
|---|---|---|---|---|
| (1) | A(00) | — | A(01) | — |
| (2) | A(02) | 2 | A(03) | 2 |
| (3) | A(05) | 3* | A(06) | 3* |
| (4) | A(07) | 2 | A(08) | 2 |

*nonstandard read increment

In Rclk cycle (3), read addresses Raddr_a and Raddr_b are incremented by a clock correction increment (in this case an increment of three) instead of the standard read increment (two). Read address Raddr_a therefore goes from memory location A(02) to memory location A(05), and read address Raddr_b goes from memory location A(03) to memory location A(06). In this manner, correction block X is not read out of memory location A(04). This clock correction operation begins with an adjustment to (leading) read address Raddr_a in read clock cycle (3), and therefore can be designated a "leading address adjustment."

In contrast, Table 10 shows a desired sequence of read addresses Raddr_a and Raddr_b for performing a delaying clock correction operation by repeating correction block X in memory location A(04).

TABLE 10

TRAILING ADDRESS ADJUSTMENT FOR DELAYING CLOCK CORRECTION

| Read Clock Cycle | Raddr_a | Raddr_a Increment | Raddr_b | Raddr_b Increment |
|---|---|---|---|---|
| (1) | A(00) | — | A(01) | — |
| (2) | A(02) | 2 | A(03) | 2 |
| (3) | A(04) | 2 | A(04) | 1* |
| (4) | A(05) | 1* | A(06) | 2 |
| (5) | A(07) | 2 | A(08) | 2 |

*nonstandard read increment

In read clock cycle (3), the readout of correction block X is repeated—i.e., after being addressed by read address Raddr_a, memory location A(04) is again addressed by read address Raddr_b. This delaying clock correction operation involves the following sequence of operations. In read clock cycle (3), read address Raddr_a is incremented by the standard read increment (two), while read address Raddr_b is incremented by a special clock correction increment of one. Therefore, read address Raddr_a goes from memory location A(02) to memory location A(04), while read address Raddr_b goes from memory location A(03) to memory location A(04), so that both read addresses read out correction block X. During the next read cycle, read address Raddr_a is incremented by the clock correction increment (one), while read address Raddr_b is incremented by the standard read increment (two). Therefore, read address Raddr_a goes from memory location A(04) to memory location A(05), while read address Raddr_b goes from memory location A(04) to memory location A(06). Read addresses Raddr_a and Raddr_b can be incremented by the standard read increment during subsequent read cycles to resume normal read operations. In contrast to the leading address adjustment shown in Table 9, the clock correction operation depicted in Table 10 begins with an adjustment to (trailing) read address Raddr_b in read clock cycle (3). Accordingly, this type of clock correction operation can be designated a "trailing address adjustment." Note that the clock correction adjustments to read addresses Raddr_a and Raddr_b for the trailing address adjustment do not take place during a single read clock cycle, but instead the adjustments are made in consecutive read clock cycles.

Note further that, just as described with respect to the full-width delaying clock correction operation shown in Table 7, the total length of the trailing address delaying clock correction operation depicted in Table 10 can be adjusted by applying a clock correction increment of zero to read addresses Raddr_a and Raddr_b for a desired number of read clock cycles after read clock cycle (3) of Table 10, and then "completing" the trailing address adjustment in the subsequent read clock cycle. An example of such a delaying clock correction operation is shown in Table 11a, which is substantially similar to Table 10, except for the addition of read clock cycles (3a) and (3b) between read clock cycles (3) and (4). In read clock cycles (3a) and (3b), a static read increment of zero is applied to read addresses Raddr_a and Raddr_b, thereby holding both read addresses at memory location A(04). Then in read clock cycle (4), the trailing address adjustment initiated in read clock cycle (3) is completed and normal read operation resumes.

TABLE 11a

TRAILING ADDRESS ADJUSTMENT FOR EXTENDED
DELAYING CLOCK CORRECTION

| Read Clock Cycle | Raddr_a | Raddr_a Increment | Raddr_b | Raddr_b Increment |
|---|---|---|---|---|
| (1) | A(00) | — | A(01) | — |
| (2) | A(02) | 2 | A(03) | 2 |
| (3) | A(04) | 2 | A(04) | 1* |
| (3a) | A(04) | 0** | A(04) | 0** |
| (3b) | A(04) | 0** | A(04) | 0** |
| (4) | A(05) | 1* | A(06) | 2 |
| (5) | A(07) | 2 | A(08) | 2 |

*nonstandard read increment
**static read increment

Note that an extended delaying clock correction operation can start off like a trailing address adjustment, but can be completed like a leading address adjustment. An example of such a "partial" trailing address adjustment is shown in Table 11b. Table 11b is substantially similar to Table 11a, except that in read clock cycle (3b), the static read increment is only applied to read address Raddr_a. Read address Raddr_b is incremented by the same clock correction increment applied to read address Raddr_b at the start of the partial trailing address adjustment in read clock cycle (3). Normal read operation then resumes from read clock cycle (4).

TABLE 11b

PARTIAL TRAILING ADDRESS ADJUSTMENT FOR EXTENDED
DELAYING CLOCK CORRECTION

| Read Clock Cycle | Raddr_a | Raddr_a Increment | Raddr_b | Raddr_b Increment |
|---|---|---|---|---|
| (1) | A(00) | — | A(01) | — |
| (2) | A(02) | 2 | A(03) | 2 |
| (3) | A(04) | 2 | A(04) | 1* |
| (3a) | A(04) | 0** | A(04) | 0** |
| (3b) | A(04) | 0** | A(05) | 1* |
| (4) | A(06) | 2 | A(07) | 2 |
| (5) | A(08) | 2 | A(09) | 2 |

*nonstandard read increment
**static read increment

Given the memory configuration of Table 8, it may also happen that during a first read clock cycle, read addresses Raddr_a and Raddr_b access memory locations A(01) and A(02), respectively, so that memory location A(01) is accessed as a leading address (instead of a trailing address as in the above examples). In this case, accelerating and delaying clock correction operations will follow different patterns than those described previously. For example, Table 12 shows the desired sequence of read addresses Raddr_a and Raddr_b to perform an accelerating clock correction operation, skipping correction block X in memory location A(04).

TABLE 12

TRAILING ADDRESS ADJUSTMENT FOR ACCELERATING
CLOCK CORRECTION

| Read Clock Cycle | Raddr_a | Raddr_a Increment | Raddr_b | Raddr_b Increment |
|---|---|---|---|---|
| (1) | A(01) | — | A(02) | — |
| (2) | A(03) | 2 | A(05) | 3* |
| (3) | A(06) | 3* | A(07) | 2 |
| (4) | A(08) | 2 | A(09) | 2 |

*nonstandard read increment

In read clock cycle (2), read address Raddr_a is incremented by the standard read increment (two), while read address Raddr_b is incremented by a special clock correction increment of three. Therefore, read address Raddr_a goes from memory location A(01) to memory location A(03), while read address Raddr_b goes from memory location A(02) to memory location A(05), skipping memory location A(04), which stores correction block X. During the next clock cycle, read address Raddr_a is incremented by the clock correction increment (three), while read address Raddr_b is incremented by the standard read increment (two), so that read address Raddr_a goes from memory location A(03) to memory location A(06), and read address Raddr_b goes from memory location A(05) to memory location A(07). Read addresses Raddr_a and Raddr_b can then be incremented by the standard read increment during subsequent read clock cycles to resume normal read operations. This clock correction operation begins with an adjustment to (trailing) read address Raddr_b in read clock cycle (2). Therefore, like the previously described delaying clock correction, this accelerating clock correction operation is a "trailing address adjustment," and is performed in two consecutive read clock cycles.

Table 13 shows the desired sequence of read addresses Raddr_a and Raddr_b to perform a delaying clock correction operation when memory location A(01) is accessed as a leading address.

TABLE 13

LEADING ADDRESS ADJUSTMENT FOR DELAYING
CLOCK CORRECTION

| Read Clock Cycle | Raddr_a | Raddr_a Increment | Raddr_b | Raddr_b Increment |
|---|---|---|---|---|
| (1) | A(01) | — | A(02) | — |
| (2) | A(03) | 2 | A(04) | 2 |
| (3) | A(04) | 1* | A(05) | 1* |
| (4) | A(06) | 2 | A(07) | 2 |

*nonstandard read increment

During read clock cycle (2), data block d and correction block X are read out of memory locations A(03) and A(04), respectively, using read addresses Raddr_a and Raddr_b, respectively. During the next read clock cycle, both read addresses Raddr_a and Raddr_b are incremented by a clock correction increment of one, so that read address Raddr_a goes from memory location A(03) to memory location A(04) to repeat the readout of correction block x, while read address Raddr_b goes from memory location A(04) to memory location A(05) to maintain the proper relationship between the read addresses. Read addresses Raddr_a and Raddr_b can then be incremented by the standard read increment during subsequent read clock cycles to resume normal read operations. This clock correction operation begins with an adjustment to (leading) read address Raddr_a in read clock cycle (3). Accordingly, this clock correction operation is a "leading address adjustment," like the accelerating clock correction previously described.

Furthermore, just as with the trailing address delaying clock correction operation described with respect to Table 10, the leading address delaying clock correction operation shown in Table 13 can be extended by any number of read clock cycles by appropriately applying a static read increment to read addresses Raddr_a and Raddr_b before completing the delaying clock correction operation. An example of such a delaying clock correction operation is shown in Table 14a, which is substantially similar to Table 13, but adds read clock cycles (3a) and (3b) between read clock cycles (3) and (4). The delaying clock correction operation begins in read clock cycle (3), as read address Raddr_a is incremented by the clock correction increment of one. However, rather than incrementing read address Raddr_b by the same clock correction increment during the same read clock cycle, a static increment of zero is applied to keep read address Raddr_b at memory location A(04). The static read increment is applied to both read addresses Raddr_a and Raddr_b until read clock cycle (3b), during which the delaying clock correction operation is completed by applying the clock correction increment of one to read address Raddr_b, after which normal read operation resumes. In this manner, elastic buffer 200*a* can perform any desired clock correction operation on an input data stream Din that includes a one-block clock correction sequence, regardless of the position of that clock correction sequence in input data stream Din.

TABLE 14a

LEADING ADDRESS ADJUSTMENT FOR EXTENDED DELAYING CLOCK CORRECTION

| Read Clock Cycle | Raddr_a | Raddr_a Increment | Raddr_b | Raddr_b Increment |
|---|---|---|---|---|
| (1) | A(01) | — | A(02) | — |
| (2) | A(03) | 2 | A(04) | 2 |
| (3) | A(04) | 1* | A(04) | 0** |
| (3a) | A(04) | 0** | A(04) | 0** |
| (3b) | A(04) | 0** | A(05) | 1* |
| (4) | A(06) | 2 | A(07) | 2 |

*nonstandard read increment
**static read increment

Note that an extended delaying clock correction operation can start off like a leading address adjustment, but can be completed like a trailing address adjustment. An example of such a "partial" leading address adjustment is shown in Table 14b. Table 11b is substantially similar to Table 14a, except that in read clock cycle (3b), read address Raddr_a is incremented by the same clock correction increment applied to read address Raddr_a at the start of the partial leading address adjustment in read clock cycle (3). The standard read increment is applied to read address Raddr_b in read clock cycle (3), and normal read operation then resumes from read clock cycle (4).

TABLE 14b

PARTIAL LEADING ADDRESS ADJUSTMENT FOR EXTENDED DELAYING CLOCK CORRECTION

| Read Clock Cycle | Raddr_a | Raddr_a Increment | Raddr_b | Raddr_b Increment |
|---|---|---|---|---|
| (1) | A(01) | — | A(02) | — |
| (2) | A(03) | 2 | A(04) | 2 |
| (3) | A(04) | 1* | A(04) | 0** |
| (3a) | A(04) | 0** | A(04) | 0** |
| (3b) | A(04) | 1* | A(05) | 2 |
| (4) | A(06) | 2 | A(07) | 2 |

*nonstandard read increment
**static read increment

Figure 2B:
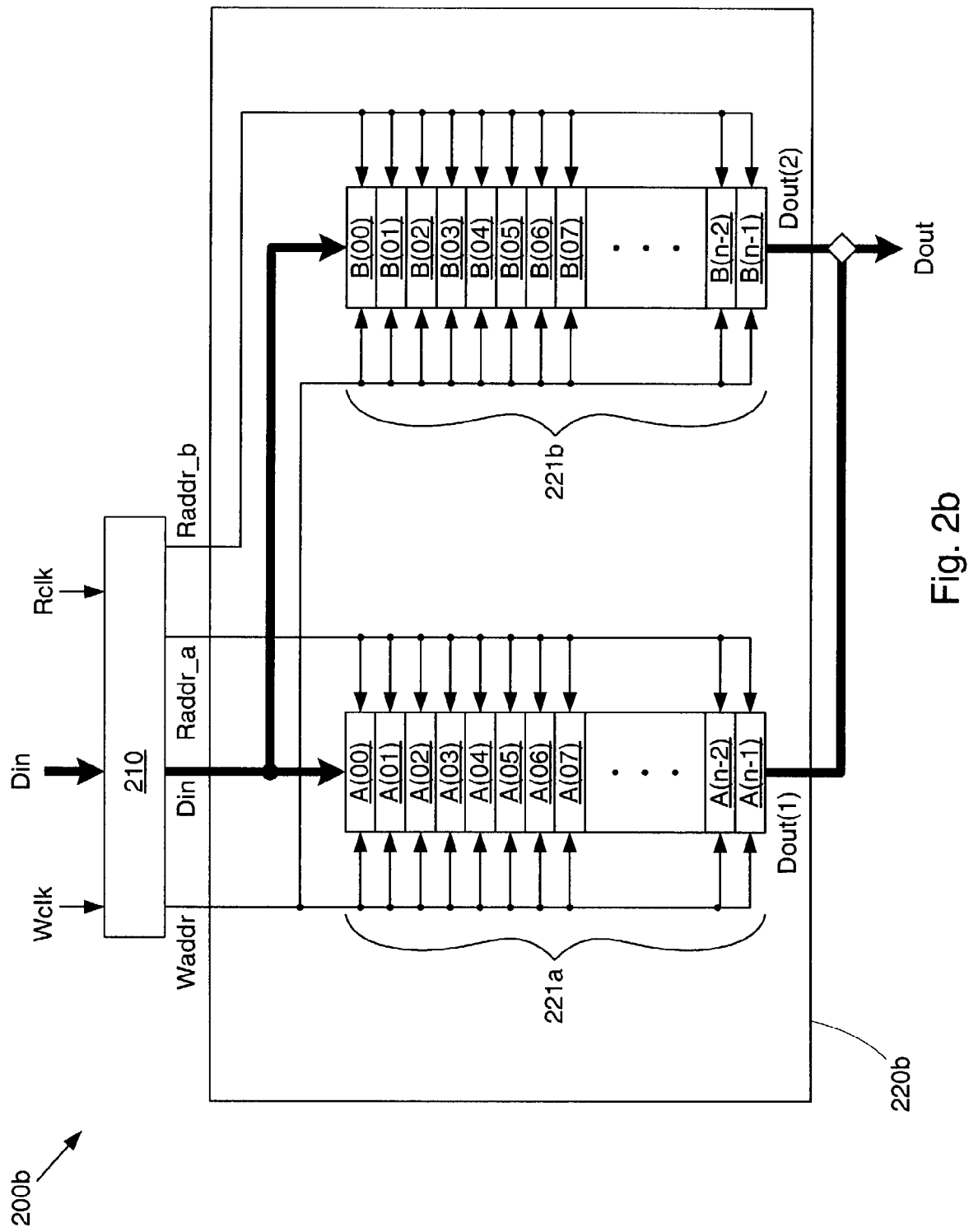
FIG. 2b shows a diagram of an elastic buffer having a multi-block width using duplicate memory arrays, according to an embodiment of the invention.

As noted previously, for explanatory purposes memory space 220 is depicted as including a single memory array having two independent read ports. However memory space 220 can comprise any memory location configuration that allows non-contiguous memory locations to be addressed during read operations. For example, FIG. 2*b* shows an elastic buffer 200*b* in accordance with another embodiment of the invention. Elastic buffer 200*b* shown in FIG. 2*b* is substantially similar to the elastic buffer 200*a* shown in FIG. 2*a*, except that memory space 220*b* in FIG. 2*b* includes two identical memory arrays 221*a* and 221*b*. Memory array 221*a* includes contiguous memory locations A(00) to A(n-1) and memory array 221*b* includes contiguous memory locations B(00) to B(n-1). During each write operation, input data stream Din and write address Waddr are provided to both memory array 221*a* and 221*b*. Therefore, the same data blocks are stored in the same locations in both memory arrays. During each read operation, a data block is read from memory array 221*a* at read address Raddr_a, while another data block is read from memory array 221*b* at read address Raddr_b. The two data blocks are then reassembled into output data stream Dout. In all other aspects, elastic buffer 200*b* operates in substantially the same manner as described previously with respect to elastic buffer 200*a*. In certain circumstances, the use of two identical one-port memory arrays instead of a single two-port memory array (as shown in FIG. 2*a*) can simplify the design of memory space 220.

Figure 2C:
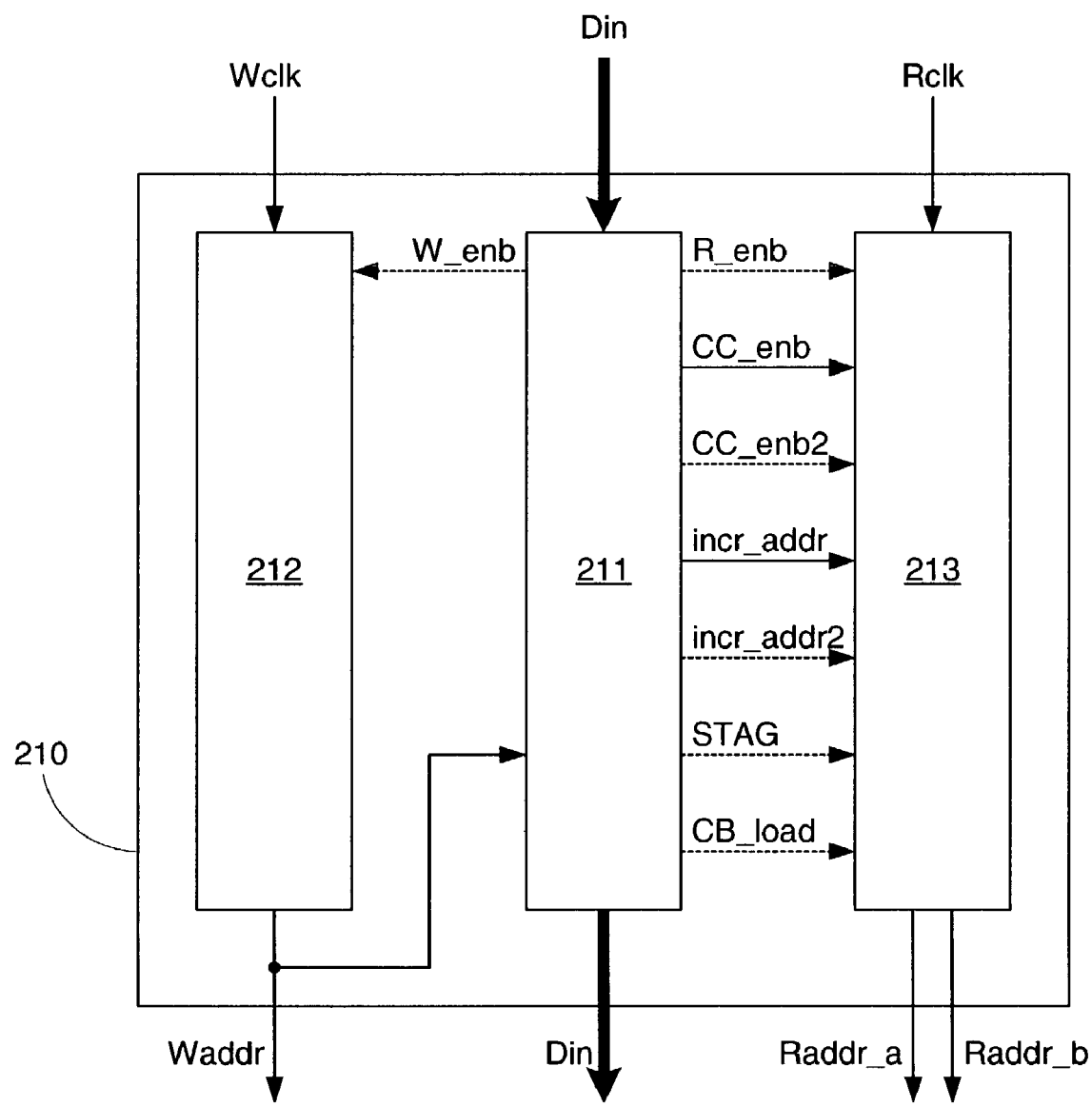
FIG. 2c shows a diagram of an elastic buffer operational control circuit in accordance with an embodiment of the present invention.

FIG. 2*c* shows a diagram of controller 210 for elastic buffer 200*a* (or 200*b*) in accordance with an embodiment of the invention. Controller 210 includes an operational control circuit 211, a write control circuit 212, and a read control circuit 213. Operational control circuit 211 monitors input data stream Din and sets a write enable signal W_enb and a read enable signal R_enb active when data is available to be written and read, respectively. When write enable signal W_enb is active, each active edge on write clock signal Wclk causes write control circuit 212 to increment write address Waddr by a standard write increment. Similarly, when read enable signal R_enb is active, a normal read operation involves read control circuit 213 incrementing read addresses Raddr_a and Raddr_b by a standard read increment in response to an active edge on read clock signal Rclk. According to an embodiment of the invention, write enable signal W_enb and read enable signal R_enb are always active, in which case the design can be optimized not to require these signals.

Operational control circuit 211 also ensures that clock correction operations are handled properly by read control circuit 213. As input data stream Din is written to memory space 220, operational control circuit 211 monitors input data stream Din and write address Waddr to keep track of the locations of correction sequences (and also channel alignment blocks) within memory space 220. Operational control circuit 211 evaluates the "fullness" of memory space 220 (as indicated by the difference between the read and write addresses), and it determines whether to do an accelerating or delaying clock correction, or continue reading normally when read address Raddr_a or read address Raddr_b reaches a correction sequence.

To execute these various actions, operational control circuit 211 provides a plurality of control signals to read control circuit 213. To initiate clock correction operations, operational control circuit 211 can generate clock correction signals CC_enb and CC_enb2, and to specify the appropriate clock correction increments, operational control circuit 211 can generate address/increment signals incr_addr and incr_addr2. Note that address/increment signals incr_addr and incr_addr2 can specify either an increment (positive or negative) by which the current address is modified, or an absolute address that replaces the current address. Operational control circuit 211 can also provide an optional stagger control signal STAG to control clock correction operations taking place across multiple read clock cycles. Finally, operational control circuit 211 can provide a channel bonding signal CB_load to control channel bonding operations, to be discussed in a subsequent section. Note that clock correction signal CC_enb2, address/increment signal incr_addr2 and stagger control signal STAG are shown as optional (using dotted lines) and can therefore represent any number of additional control signals required to perform the clock correction operations described previously. Note further that circuit 211 can maintain internal copies of write address Waddr and read address Raddr_b to ensure generation of the elastic buffer control signals in a timely fashion.

While the invention can incorporate any number of control signals, it is sometimes desirable to minimize the number of control signals required to operate an elastic buffer. While this may somewhat limit the overall functionality of the elastic buffer, the corresponding reduction in logic resource usage often makes the tradeoff worthwhile. For example, according to an embodiment of the invention, operational control circuit 211 can use only clock correction signal CC_enb, address/increment signal incr_addr, and stagger control signal STAG to manage clock correction operations in an elastic buffer having a width of two data blocks. When a clock correction operation is to be performed, operational control circuit 211 sets clock correction signal CC_enb active and provides an appropriate clock correction increment to read control circuit 213 via address/increment signal incr_addr. Because the clock correction adjustments can either be applied during a single read clock cycle or in multiple read clock cycles, operational control circuit 211 also provides stagger control signal STAG to read control circuit 213.

This reduced-count control signal set provides extensive elastic buffer functionality using a minimum of control signals. This efficiency is due in large part to the presence of stagger control signal STAG. For leading address adjustments in which both read addresses Raddr_a and Raddr_b are adjusted by the clock correction increment during the same read clock cycle, stagger control signal STAG is held in a first state. For trailing address adjustments in which the clock correction increment is to be applied first to read address Raddr_b in one read clock cycle and then to read address Raddr_a in the next read clock cycle, stagger control signal STAG is set to a second state. Accordingly, in an elastic buffer having a width of two data blocks (such as elastic buffer 200a shown in FIG. 2a), stagger control signal STAG can be implemented using a single bit, thereby providing an efficient control mechanism for clock correction operations. One such single-bit stagger control signal implementation is shown in Table 15.

TABLE 15

STAGGER CONTROL SIGNAL STATE SETTINGS

| Mode | Clock Operation | Beginning Correction Position | Ending Correction Position | STAG |
| --- | --- | --- | --- | --- |
| (1) | Accelerating | Leading | — | inactive |
| (2) | Accelerating | Trailing | — | active |
| (3) | Delaying | — | Trailing | inactive |
| (4) | Delaying | — | Leading | active |

Table 15 demonstrates how various combinations of clock correction operations and clock correction sequences can be used to define the settings for stagger control signal STAG. For example, mode (1) of Table 15 lists an accelerating clock correction operation where the beginning (first) correction block in a correction block sequence is in the leading position (i.e., would be read by read address Raddr_a during a normal read operation). In such circumstances, clock correction adjustments would be made to both read addresses Raddr_a and Raddr_b during the same read clock cycle (for example, as described previously with respect to Table 9). Therefore, stagger control signal STAG is set to an inactive state. However, if the beginning correction block is in the trailing position for such a clock correction operation (as listed for mode (2) of Table 15 and previously described with respect to Table 12), clock correction operations to read addresses Raddr_b and Raddr_a would be made in consecutive read clock cycles, necessitating an active stagger control signal STAG. Thus, the state of stagger control signal STAG for an accelerating clock correction operation is determined by the position of the beginning correction block.

In contrast, the state of stagger control signal STAG in Table 15 for delaying clock correction operations is based on the position of the ending (last) correction block in the correction block sequence. In the delaying clock correction operation listed for mode (3), the ending correction block is in the trailing position. In such a case, the clock correction adjustments begin with the leading read address (Raddr_a), for example as described with respect to Table 13. Therefore, stagger control signal STAG is set inactive, since both clock correction adjustments would then be performed during a single read clock cycle. However, for the delaying clock correction operation listed for mode (4) in which the ending correction block is in the leading position, the clock correction operations would begin with the trailing read address (Raddr_b). The prior description of Table 10 provides an example of such a situation, indicating that stagger control signal STAG should be set active to ensure that the clock correction operations are performed in successive read clock cycles.

Note further that according to various other embodiments of the invention, stagger control signal STAG can be a multi-bit signal. An elastic buffer having a width greater than two data blocks, stagger control signal STAG may need to provide information as to the order and timing or read address adjustments. For example, in an elastic buffer having a width of three data blocks, one of the read addresses could be adjusted in a first read clock cycle, while the other two read addresses could be adjusted in a subsequent read clock cycle. Alternatively, two read addresses could be adjusted during the first read clock cycle, with the remaining read address being adjusted during the second read clock cycle. In such a situation, a multi-bit stagger control signal STAG could be used to differentiate between the two "staggered" clock correction operations In any case, the reduced-count control signal set described above provides significant operational command capability, even allowing clock correction operations to be carried out for correction sequences longer than one data block, and also allowing skipping or repeating more than one consecutive correction sequence. In all such cases, the resulting sequence of memory locations copied to output data stream Dout consists of consecutive (contiguous) memory locations except for one memory location that appears out of sequence. The same clock correction increment (not equal to the standard read increment) is applied to both Raddr_a and Raddr_b. For a two-block-width elastic buffer, the size of the clock correction increment INCR_ACC for an accelerating clock correction can be provided by the formula:

$$INCR\_ACC = 2 + (j*n) \quad (a)$$

where n is the length in data blocks of a correction sequence, and j is the number of consecutive correction sequences to be skipped. The size of the clock correction increment for a delaying clock correction INCR_DEL can be provided by the formula:

$$INCR\_DEL = 2 - (k*n) \quad (b)$$

where n is the length in data blocks of a correction sequence, and k gives the number of consecutive correction sequences to be repeated. If the out-of-sequence memory location is addressed by Raddr_a, the clock correction requires a leading address adjustment, in which both read addresses Raddr_a and Raddr_b are incremented by the clock correction increment in the same read clock cycle. If the out-of-sequence memory location is addressed by Raddr_b, the clock correction requires a trailing address adjustment, in which read address Raddr_a is incremented by the clock correction increment in the read clock cycle following the read clock cycle in which read address Raddr_b is incremented by the clock correction increment. Otherwise, during normal operation of elastic buffer 200a both read addresses Raddr_a and Raddr_b are incremented by the standard read increment (two in the present example) during each read clock cycle. Note that the clock correction increment for a delaying clock correction may be less than zero. For example, in formula (b), for k equal to 1 and n equal to 4, the delaying clock correction increment INCR_DEL is −2. According to an embodiment of the invention, in a two-block-wide elastic buffer, the length of a correction sequence (n) can be 1, 2, 3, or 4, the number of consecutive correction sequences that can be skipped (j) can be 1 or 2, and the number of correction sequences that can be repeated (k) is 1. In this manner, the three control signals CC_enb, incr_addr, and STAG provide substantial elastic buffer functionality using a minimum of communications paths.

Figure 2D:
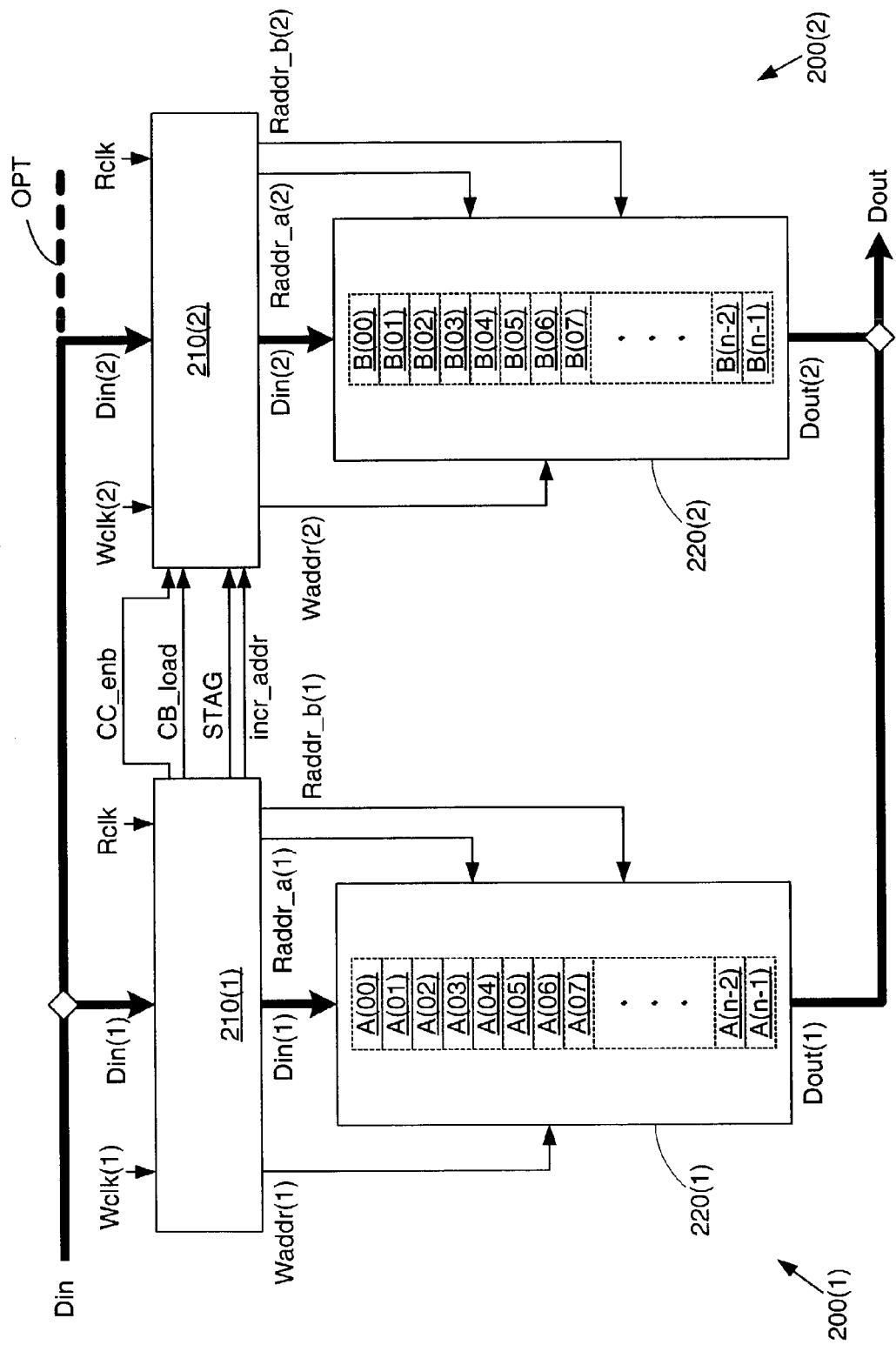
FIG. 2d shows a diagram of multi-channel elastic buffer configuration, using multi-block width elastic buffers, each with multiple read addresses, in accordance with an embodiment of the present invention.

As mentioned previously, operational control circuit 211 can also provide channel bonding signal CB_load to control channel bonding operations in a multi-channel elastic buffer configuration. For example, FIG. 2d shows elastic buffers 200(1) and 200(2) in a multi-channel configuration for buffering an input data stream Din, in accordance with an embodiment of the present invention. Elastic buffers 200(1) and 200(2) are substantially similar to, and operate in substantially the same manner as, elastic buffer 200a shown in FIG. 2a. Note that while a two-channel arrangement is depicted, any number of elastic buffers could be used for any number of channels, as indicated by dashed line OPT.

Input data stream Din is split into two partial data streams Din(1) and Din(2), by feeding alternating blocks from input data stream Din into each partial data stream. (Other ways of interleaving blocks between the two partial data streams are also possible.) On every positive edge on write clock signal Wclk(1), two data blocks from partial data stream Din(1) are sent to elastic buffer 200(1) and stored in memory space 220(1) at write address Waddr(1), while two data blocks from partial data stream Din(2) are sent to elastic buffer 200(2) and stored in memory space 220(2) at write address Waddr(2) on every positive edge on write clock signal Wclk(2). Note that while write clocks Wclk(1) and Wclk(2) may be out of phase with each other, they have the same frequency. Therefore, on each write clock cycle, four sequential data blocks from input data stream Din are stored.

Similarly, on every positive edge on read clock signal Rclk, four data blocks are read—two from read addresses Raddr_a(1) and Raddr_b(1) in memory space 220(1) (as part of partial data stream Dout(1)), and two from read addresses Raddr_a(2) and Raddr_b(2) in memory space 220(2) (as part of partial data stream Dout(2)). These four data blocks are reassembled into sequential data blocks in output data stream Dout.

As noted previously, in a multi-channel configuration, one of the elastic buffers is designated the master and controls clock correction and channel bonding operations of the other slave elastic buffers. In FIG. 2d, elastic buffer 200(1) is designated the master. Therefore, controller 210(1) of elastic buffer 200(1) provides clock correction signal CC_enb, channel bonding signal CB_load, stagger control signal STAG, and increment/address signal incr_addr to controller 210(2) of elastic buffer 200(2). Note that while an individual elastic buffer would typically generate its own clock correction signal CC_enb, stagger control signal STAG, and increment/address signal incr_addr, in a multi-channel configuration all clock correction operations (in addition to channel bonding operations) must be controlled by the master elastic buffer to maintain proper data alignment.

As noted previously, controller 210(1) can internally record the memory locations of alignment block sequences stored in memory space 220(1), and controller 210(2) can internally record the memory locations of alignment block sequences stored in memory space 220(2). When an alignment block is read from memory space 220(1), controller 210(1) sets channel bonding signal CB_load to an active state after a predetermined wait period, hereafter referred to as a "channel bonding wait" (CBW). The CBW is defined as a fixed number of data blocks (including the alignment block sequence) that must be read before the actual data alignment is performed. The CBW is selected to ensure that all the elastic buffers have an available alignment block stored within memory to which the alignment can be referenced. Converting the CBW to a corresponding number of read clock cycles ("wait cycles") that must pass before channel bonding signal CB_load is activated depends on a variety of factors, including: (a) the number of data blocks specified as the CBW; (b) whether that number is even or odd; and (c) the position of the alignment block in the memory space (either leading or trailing, depending on whether it will be addressed by read address Raddr_a(1) or read address Raddr_b(1) during normal reading). A set of possible wait cycle formulas for elastic buffers having a two-data-block width according to an embodiment of the invention is listed in Table 16.

TABLE 16

WAIT CYCLE FORMULAS

| | (1) | (2) | (3) | (4) |
|---|---|---|---|---|
| CBW Even or Odd | Even | Odd | Even | Odd |
| Alignment Block Position | Leading Raddr_a(1) | Leading Raddr_a(1) | Trailing Raddr_b(1) | Trailing Raddr_b(1) |
| Wait Cycles | $\dfrac{CBW}{2}$ | $\dfrac{(CBW-1)}{2}$ | $\dfrac{CBW}{2}$ | $\dfrac{(CBW+1)}{2}$ |
| STAG | Inactive | Active | Active | Inactive |

Note that the CBW could be less than the number of alignment blocks in the alignment block sequence, in which case channel bonding would begin before the entire alignment block sequence was read. Note also that Table 16 also includes stagger control signal STAG, which controls the timing of the read address adjustments during channel bonding operations. Just as in clock correction operations, the channel bonding adjustments to read addresses Raddr_a(1) and Raddr_b(1) in master elastic buffer 200(1) and read addresses Raddr_a(2) and Raddr_b(2) in slave elastic buffer 200(2) can either take place during the same read clock cycle or can take place during two consecutive read clock cycles. If stagger control signal STAG is in an inactive state, the channel bonding adjustment is applied to both read addresses during the same read clock cycle. If stagger control signal STAG is in an active state, channel bonding adjustments to the trailing read addresses (read addresses Raddr_b(1) and Raddr_b(2)) are performed in one read clock cycle, while the channel bonding adjustments are made to the leading read addresses (read addresses Raddr_a(1) and Raddr_a(2)) during the next read clock cycle.

Assume that input data stream Din is made up of consecutive data blocks a, b, c, d, W1, W2, e, f, g, h, i, j, k, l, m, n, and so forth, where data blocks W1 and W2 represent alignment blocks. Then partial data stream Din(1) would be formed by data blocks a, c, W1, e, g, i, k, m and so forth, while partial data stream Din(2) would be formed by data blocks b, d, W2, f, h, j, l, n, and so forth. Due to transmission line delays and other system inaccuracies, the stored arrangement of data blocks in memory spaces 220(1) and 220(2) could be as shown in Table 17.

TABLE 17

MISALIGNED MULTI-CHANNEL DATA, LEADING ALIGNMENT BLOCK

| 220(1) | 220(2) |
|---|---|
| A(00): a | B(00): U* |
| A(01): c | B(01): U* |
| A(02): W1 | B(02): b |
| A(03): e | B(03): d |
| A(04): g | B(04): W2 |
| A(05): i | B(05): f |
| A(06): k | B(06): h |
| A(07): m | B(07): j |
| . | B(08): l |
| . | B(09): n |
| . | . |
| . | . |
| . | . |

*Unknown or pre-existing data block

Assuming that read addresses Raddr_a(1) and Raddr_b(1) of elastic buffer 200(1) initially match read addresses Raddr_a(2) and Raddr_b(2), respectively, of elastic buffer 200(2), normal read operations on the misaligned data shown in Table 14a would create a corrupted output data stream Dout. For example, a first read operation would read and interleave the data from memory locations A(00) and A(01) in memory space 220(1), and from memory locations B(00) and B(01) in memory space 220(2), thereby reading out the incorrect sequence of data blocks a, U, c, U, rather than the expected data block sequence a, b, c, d. Subsequent read operations would read out similarly incorrect sequences of data blocks. Therefore, a channel bonding operation is required to ensure accurate readout of the stored data blocks.

The actual channel bonding operation proceeds as follows. First, master elastic buffer 200(1) performs a normal read operation on contiguous memory locations A(02) and A(03), while slave elastic buffer 200(2) performs a normal read operation on memory locations B(02) and B(03). After detecting alignment block W1 stored in memory location A(02), elastic buffer 200(1) begins the CBW countdown—i.e., waiting for the specified number of data blocks to pass before initiating the channel bonding adjustments. Normal read operations therefore continue until the required number of data blocks has been read.

For example, if the CBW is four data blocks, then controller 210(1) copies exactly four blocks to Dout(1), starting with alignment block W1, before aligning the channels. Note that while the example channel bonding operations described herein will be described with respect to CBWs of three or four data blocks, a CBW for use with the invention can include any number of data blocks. Table 18 shows the resulting desired sequences of read addresses, assuming that the alignment location for each elastic buffer equals the memory location of the alignment block plus the CBW.

TABLE 18

ALIGNMENT FOR LEADING ALIGNMENT BLOCK, EVEN CBW

| Master | | | | Slave | | | |
|---|---|---|---|---|---|---|---|
| Readdr_a(1) | | Readdr_b(1) | | Raddr_a(2) | | Raddr_b(2) | |
| Loc'n | Incr. | Loc'n | Incr. | Loc'n | Incr. | Loc'n | Incr. |
| A(00) | — | A(01) | — | B(00) | — | B(01) | — |
| A(02)[1] | 2 | A(03) | 2 | B(02) | 2 | B(03) | 2 |
| A(04) | 2 | A(05) | 2 | B(04)[1] | 2 | B(05) | 2 |
| A(06)[2] | 2 | A(07) | 2 | B(08)[2] | 4* | B(09) | 4* |
| A(08) | 2 | A(09) | 2 | B(10) | 2 | B(11) | 2 |

[1]W1 or W2 location, remembered by operational control circuit 211
[2]channel bonding adjustment here; set to W1/W2 location plus CBW
*nonstandard read increment In this case, the master alignment block W1 is read by leading address Raddr_a(1), and CBW is even, so column (1) in Table 16 applies. Accordingly, stagger control signal STAG is inactive, and two wait cycles (2=4/2) must pass before channel bonding signal CB_load can be set active. After the read clock cycle in which data blocks g and i are read from memory locations A(04) and A(05), respectively, the channel bonding adjustments can commence.

The channel bonding adjustments involve adjusting the read addresses of the elastic buffers so that within each elastic buffer, the positions of the memory locations being read relative to the stored alignment block are the same. For example, memory location A(06) immediately follows the CBW sequence (data blocks W1, e, g, and i) and is positioned four address blocks after the memory location (A(02)) in which alignment block W1 is stored. Therefore, when channel bonding signal CB_load is activated, each of the slave elastic buffers can set its corresponding read address to the same relative read address—i.e., a read address pointing to a memory location four address units after the memory location storing their respective alignment blocks. Using such a technique, no channel bonding adjustment to the read addresses of master elastic buffer 200(1) would be required.

Thus, in the present example, after the final (second) read clock cycle after master elastic buffer 200(1) detects alignment block W1, read address Raddr_a(2) of slave elastic buffer 200(2) is set to memory location B(08), while read address Raddr_b(2) is set to memory location B(09) to maintain the appropriate relationship between the two read addresses. Note that both read addresses Raddr_a(2) and Raddr_b(2) are adjusted by the same "channel bonding increment" (four), with read address Raddr_a(2) going from memory location B(04) to memory location B(08) and read address Raddr_b(2) going from memory location B(05) to memory location B(09). Because stagger control signal STAG is not active, the channel bonding increment is applied to both read addresses during a single read clock cycle. Note that during the same read clock cycle, read addresses Raddr_a(1) and Raddr_b(1) are adjusted by the standard read increment (two). In this manner, slave elastic buffer 200(2) is aligned with master elastic buffer 200(1).

Similarly, if the CBW is three data blocks, then controller 210(1) copies exactly three blocks to Dout(1), starting with alignment block W1, before aligning the channels. Table 19 shows the resulting desired sequences of read addresses, again assuming that the alignment location for each elastic buffer equals the memory location of the alignment block plus CBW address units.

TABLE 19

ALIGNMENT FOR LEADING ALIGNMENT BLOCK, ODD CBW

| Master | | | | Slave | | | |
|---|---|---|---|---|---|---|---|
| Raddr_a(1) | | Raddr_b(1) | | Raddr_a(2) | | Raddr_b(2) | |
| Loc'n. | Incr. | Loc'n. | Incr. | Loc'n. | Incr. | Loc'n. | Incr. |
| A(00) | — | A(01) | — | B(00) | — | B(01) | — |
| A(02)[1] | 2 | A(03) | 2 | B(02) | 2 | B(03) | 2 |
| A(04) | 2 | A(05)[2] | 2 | B(04)[1] | 2 | B(07)[2] | 4* |
| A(06) | 2 | A(07) | 2 | B(08) | 4* | B(09) | 2 |
| A(08) | 2 | A(09) | 2 | B(10) | 2 | B(11) | 2 |

[1]W1 or W2 location, remembered by operational control circuit 211
[2]channel bonding adjustment here; set to W1/W2 location plus CBW
*nonstandard read increment In this case, alignment block W1 in master elastic buffer 200(1) is read by leading read address Raddr_a(1), and the CBW is odd (three), so column (2) in Table 15 applies. Accordingly, stagger control signal STAG is set active, and one wait cycle (1=(3−1)/2) must pass before data alignment can commence. However, note that even after that one wait cycle, the CBW countdown is not fully complete until data block g (the third data block in the CBW sequence) is read from memory location A(04) during the following read clock cycle. Therefore, the channel bonding operation begins with trailing memory location A(05). Because memory location A(05) is three address units from the memory location of alignment block W1, trailing read address Raddr_b(2) of slave elastic buffer 200(2) is adjusted to correspond to the memory location in memory space 220(2) located three address units from stored alignment block W2. The amount of this adjustment to trailing read address Raddr_b(2) becomes the channel bonding increment. Then, during the next read clock cycle, leading read address Raddr_a(2) is adjusted by the channel bonding increment, while trailing read address Raddr_b(2) is incremented by the standard read increment, thereby restoring the proper relationship between read addresses Raddr_a(2) and Raddr_b(2). Because stagger control signal STAG is active, controller 210(2) of slave elastic buffer 200(2) knows to apply the channel bonding increment to read addresses Raddr_b(2) and Raddr_a(2) in this staggered sequence.

With regard to the specifics of the present example, during the CBW wait cycle, memory locations A(02) and A(03) of memory space 220(1) and memory locations B(02) and B(03) of memory space 220(2) are read in a normal manner. For the next read clock cycle, the read addresses of master elastic buffer 200(1) are incremented by the standard read increment (two), so that read address Raddr_a(1) goes from memory location A(02) to memory location A(04) and read address Raddr_b(1) goes from memory location A(03) to memory location A(05). Meanwhile, because stagger control signal STAG is active, leading read address Raddr_a(2) is incremented by the standard read increment (two) to go from memory location B(02) to memory location B(04), while trailing read address Raddr_b(2) is incremented by the appropriate channel bonding increment (four) to go from memory location B(03) to memory location B(07). At this point, trailing address Raddr_b(2) corresponds to a memory location (B(07)) having the same position relative to the memory location of alignment block W2 (memory location B(04)) that memory location A(05) has with the memory location of alignment block W1 (memory location A(02)). To complete the channel bonding operation, on next read clock cycle, leading read address Raddr_a(2) is incremented by the channel bonding increment (four) to go from memory location B(04) to memory location B(08), while trailing read address Raddr_b(2) is incremented by the standard read increment (two), going from memory location B(07) to memory location B(09). This places read addresses Raddr_a(2) and Raddr_b(2) back into their proper relationship, and normal read operations can be resumed.

As described previously, an alignment block can also be stored in a trailing position in memory space 220(1), to be addressed by Raddr_b(1). For example, input data stream Din could be made up of consecutive data blocks a, b, c, d, e, f, W1, W2, g, h, i, j, k, l, m, n, o, p, q, r, and so forth, where data blocks W1 and W2 represent alignment blocks. Then partial data stream Din(1) would be formed by data blocks a, c, e, W1, g, i, k, m, o, q, and so forth, while partial data stream Din(2) would be formed by data blocks b, d, f, W2, h, j, l, n, p, r, and so forth. Due to transmission line delays and other system inaccuracies, the stored arrangement of data blocks in memory spaces 220(1) and 220(2) could be as shown in Table 20, for example.

TABLE 20

MISALIGNED MULTI-CHANNEL DATA, TRAILING ALIGNMENT BLOCK

| 220(1) | 220(2) |
|---|---|
| A(00): a | B(00): U* |
| A(01): c | B(01): U* |
| A(02): e | B(02): b |
| A(03): W1 | B(03): d |
| A(04): g | B(04): f |

TABLE 20-continued

MISALIGNED MULTI-CHANNEL DATA, TRAILING ALIGNMENT BLOCK

| 220(1) | 220(2) |
|---|---|
| A(05): i | B(05): W2 |
| A(06): k | B(06): h |
| A(07): m | B(07): j |
| A(08): o | B(08): l |
| A(09): q | B(09): n |
| . | B(10): p |
| . | B(11): r |
| . | . |
| | . |
| | . |

*Unknown or pre-existing data block

Assuming that read addresses Raddr_a(1) and Raddr_b(1) of elastic buffer 200(1) initially match read addresses Raddr_a(2) and Raddr_b(2), respectively, of elastic buffer 200(2), normal read operations on the misaligned data shown in Table 20 would create a corrupted output data stream Dout, just as with the data storage arrangement shown in Table 17. Therefore, a channel bonding operation is required to ensure accurate readout of the stored data blocks.

The actual channel bonding operation proceeds as follows. First, master elastic buffer 200(1) performs a normal read operation on contiguous memory locations A(02) and A(03), while slave elastic buffer 200(2) performs a normal read operation on memory locations B(02) and B(03). After detecting alignment block W1 stored in memory location A(03), elastic buffer 200(1) begins the CBW countdown, and normal read operations continue until the specified number of data blocks has been read. For example, if the CBW is four data blocks, Table 21 shows the resulting desired sequences of read addresses.

TABLE 21

ALIGNMENT FOR TRAILING ALIGNMENT BLOCK, EVEN CBW

| Master | | | | Slave | | | |
|---|---|---|---|---|---|---|---|
| Raddr_a(1) | | Raddr_b(1) | | Raddr_a(2) | | Raddr_b(2) | |
| Loc'n. | Incr. | Loc'n. | Incr. | Loc'n. | Incr. | Loc'n. | Incr. |
| A(00) | — | A(01) | — | B(00) | — | B(01) | — |
| A(02) | 2 | A(03)[1] | 2 | B(02) | 2 | B(03) | 2 |
| A(04) | 2 | A(05) | 2 | B(04) | 2 | B(05)[1] | 2 |
| A(06) | 2 | A(07)[2] | 2 | B(06) | 2 | B(09)[2] | 4* |
| A(08) | 2 | A(09) | 2 | B(10) | 4* | B(11) | 2 |

[1]W1 or W2 location, remembered by operational control circuit 211
[2]channel bonding adjustment here; set to W1/W2 location plus CBW
*nonstandard read increment Alignment block W1 in master elastic buffer 200(1) is read by trailing address Raddr_b(1), and the CBW is even (four), so column (3) of Table 16 applies. Accordingly, stagger control signal STAG is set active, while two wait cycles (2=4/2) must pass before channel bonding signal CB_load can be set active.

The CBW countdown is not fully complete until data block k (the fourth data block in the CBW sequence) is read from memory location A(06) during the read clock cycle following the final wait cycle. Therefore, the channel bonding adjustments begin with trailing memory location A(07). Because memory location A(07) is four address units from the memory location of alignment block W1, trailing read address Raddr_b(2) of slave elastic buffer 200(2) is adjusted to correspond to the memory location in memory space 220(2) located four address units from stored alignment block W2. The amount of this adjustment (four) to trailing read address Raddr_b(2) becomes the channel bonding increment. Because stagger control signal STAG is active, leading read address Raddr_a(2) is adjusted by the channel bonding increment during the next read clock cycle, while trailing read address Raddr_b(2) is incremented by the standard read increment, thereby restoring the proper relationship between read addresses Raddr_a(2) and Raddr_b(2).

With regard to the present example, during the final wait cycle memory locations A(04) and A(05) of memory space 220(1) are read in a normal manner, and memory locations B(04) and B(05) of memory space 220(2) are read in a normal manner. For the next read clock cycle, the read addresses of master elastic buffer 200(1) are incremented by the standard read increment (two), so that read address Raddr_a(1) goes from memory location A(04) to memory location A(06) and read address Raddr_b(1) goes from memory location A(05) to memory location A(07). Meanwhile, because stagger control signal STAG is active, leading read address Raddr_a(2) is incremented by the standard read increment (two) to go from memory location B(04) to memory location B(06), while trailing read address Raddr_b(2) is incremented by the appropriate channel bonding increment (four) to go from memory location B(05) to memory location B(09). At this point, trailing address Raddr_b(2) corresponds to a memory location (B(09)) having the same position relative to the memory location of alignment block W2 (memory location B(05)) that memory location A(07) has with the memory location of alignment block W1 (memory location A(03)). To complete the channel bonding operation, on next read clock cycle, leading read address Raddr_a(2) is incremented by the channel bonding increment (four) to go from memory location B(06) to memory location B(10), while trailing read address Raddr_b(2) is incremented by the standard read increment (two), going from memory location B(09) to memory location B(11). This places read addresses Raddr_a(2) and Raddr_b(2) back into their proper relationship, and normal read operations can be resumed.

Similarly, if CBW is three data blocks, Table 22 shows the resulting desired sequences of read addresses.

TABLE 22

ALIGNMENT FOR TRAILING ALIGNMENT BLOCK, ODD CBW

| Master | | | | Slave | | | |
|---|---|---|---|---|---|---|---|
| Raddr_a(1) | | Raddr_b(1) | | Raddr_a(2) | | Raddr_b(2) | |
| Loc'n. | Incr. | Loc'n. | Incr. | Loc'n. | Incr. | Loc'n. | Incr. |
| A(00) | — | A(01) | — | B(00) | — | B(01) | — |
| A(02) | 2 | A(03)[1] | 2 | B(02) | 2 | B(03) | 2 |
| A(04) | 2 | A(05) | 2 | B(04) | 2 | B(05)[1] | 2 |
| A(06)[2] | 2 | A(07) | 2 | B(08)[2] | 4* | B(09) | 4* |
| A(08) | 2 | A(09) | 2 | B(10) | 2 | B(11) | 2 |

[1]W1 or W2 location, remembered by operational control circuit 211
[2]channel bonding adjustment here; set to W1/W2 location plus CBW
*nonstandard read increment Alignment block W1 stored in master elastic buffer 200(1) is read by trailing address Raddr_b(1), and the CBW is odd, so column (4) in Table 16 applies. Accordingly, two wait cycles (2=(3+1)/2) must pass before data alignment can commence. In addition, stagger control signal STAG is set to an inactive state, so that the channel bonding increment is applied to all read addresses during a single read clock cycle.

Thus, after the final wait cycle, read address Raddr_a(1) of master elastic buffer 200(1) is incremented by the standard read increment (two) to go from memory location A(04) to memory location A(06). Because memory location A(06) is three address units away from the memory location (A(03)) of alignment block W1, read address Raddr_a(2) of slave elastic buffer 200(2) is adjusted to correspond to the memory location (B(08)) in memory space 220(2) located three address units from stored alignment block W2. Read address Raddr_a(2) therefore goes from memory location B(04) to B(08), with the amount of this adjustment (four) becoming the channel bonding increment. Therefore, during the same read clock cycle, read address Raddr_b(2) of slave elastic buffer 200(2) is also incremented by the channel bonding increment (four), going from memory location B(05) to memory location B(09) to complete the channel bonding operation and allow the resumption of normal read operations.

According to an embodiment of the invention, the control logic of Table 16 can be efficiently implemented using a position indicator signal TRAIL and a signal SUM computed from position indicator signal TRAIL and the channel bonding wait CBW. Signals SUM and TRAIL can be used to determine the state setting for stagger control bit STAG, and also the number of wait cycles required before channel bonding (hereafter designated by the variable WAIT_CYCLES). Position indicator signal TRAIL is set to either 0 or 1 for a leading alignment block position (e.g., Raddr_a (1) in Table 16) or a trailing alignment block position (e.g., Raddr_b(1) in Table 16), respectively. Signal SUM is defined to have a width one bit larger than the width of channel bonding wait CBW, and is calculated as the sum of channel bonding wait CBW and position indicator signal TRAIL. The least significant bit (LSB) of signal SUM then becomes the state setting for stagger control bit STAG, while the remaining bits of signal SUM specify the number of required wait cycles WAIT_CYCLES. For example, a four-bit channel bonding wait CBW[3:0], would require a five-bit signal SUM[4:0]. Signal SUM is then determined according to the following operation:

$$SUM[4:0]=CBW[3:0]+TRAIL \qquad (n)$$

The LSB of signal SUM then defines stagger control bit STAG as follows:

$$STAG=SUM[0]$$

Finally, the remaining bits of SUM provide the required number of wait cycles as follows:

$$WAIT\_CYCLES[3:0]=SUM[4:1]$$

In this manner, both the stagger control setting and the required number of wait cycles can be efficiently determined.

Note that after completion of a channel bonding operation, the resulting data alignment could be destroyed if all the elastic buffers executed different clock corrections (type and/or timing). Therefore, according to an embodiment of the invention, master elastic buffer 200(1) can maintain data alignment produced by controlling clock correction operations for all slave elastic buffers as well as for itself. Controller 210(1) in master elastic buffer 200(1) could control channel alignment and clock correction by means of the CC_enb, CB_load, STAG, and incr_addr signal connections as shown in FIG. 2*d*. According to an embodiment of the invention, these signals could be asserted early and buffered inside controllers 210(1) and 210(2) for subsequent assertion at an appropriate time, thereby accommodating signal routing delays between elastic buffers.

As described previously, an embodiment of the invention encodes the control signals into a reduced-count control signal set to minimize the number of control signals routed between elastic buffers. Such an encoding may assume that each controller 210(1), 210(2), etc. independently has built-in knowledge of the parameters controlling clock correction (e.g., length n of the correction sequence) and channel alignment (e.g., channel bonding adjustment relative to the alignment block). According to an embodiment of the invention, signals CC_enb, CB_load, and incr_addr can be encoded in a collective signal COLL, an example of which is shown in Table 23, with stagger control signal STAG remaining as a separate control signal.

TABLE 23

ENCODING OF CONTROL SIGNALS ROUTED BETWEEN ELASTIC BUFFERS

| COLL | Action | EQ'n* | N | j | k |
|---|---|---|---|---|---|
| 000 | Std read increment (no correction/alignment) | n/a | ** | n/a | n/a |
| 001 | Skip one correction sequence | (a) | ** | 1 | n/a |
| 010 | Skip two correction sequences | (a) | ** | 2 | n/a |
| 101 | Execute channel alignment | n/a | ** | n/a | n/a |
| 111 | Repeat one correction sequence | (b) | ** | n/a | 1 |

Referencing Equations (a) and (b), which were previously discussed with respect to INCR_ADDR and INCR_DEL, respectively
**value built-in to local elastic buffer Note that in each of the examples considered previously, the clock correction or channel bonding operations have been "isolated" operations—i.e., the particular clock correction or channel bonding operation has been completed before any other clock correction or channel bonding operations have been begun. In an isolated clock correction clock correction or channel bonding operation, the same clock correction increment or channel bonding increment, respectively, is added to both read addresses Raddr_a and Raddr_b, either in the same read clock cycle or in consecutive cycles. Otherwise, Raddr_a and Raddr_b are incremented by a standard read increment equal to the number of blocks read per clock cycle (two in the examples previously described). However, an "overlapping" operation (i.e., multiple clock correction and/or channel bonding operations that are performed at least partially in parallel) can result in unequal clock correction and/or channel bonding increments (hereafter "correction increments") being applied to read addresses Raddr_a and Raddr_b. Typically, this can occur when the number of data blocks between correction sequences in the input data stream is less than the width of the elastic buffer, and both correction sequences are used in clock correction and/or channel bonding operations. Table 24 shows an example of stored data blocks that could give rise to an overlapping clock correction operation, where each data block X is a correction block.

TABLE 24

MEMORY CONTENTS FOR POTENTIAL OVERLAPPING CLOCK CORRECTION AND/OR CHANNEL BONDING OPERATIONS

A(00): a
A(01): b
A(02): c
A(03): x

TABLE 24-continued

MEMORY CONTENTS FOR POTENTIAL OVERLAPPING CLOCK
CORRECTION AND/OR CHANNEL BONDING OPERATIONS

A(04): d
A(05): X
A(06): e
A(07): f
A(08): g
A(09): h

Note that skipping either memory location A(03) or memory location A(05) alone would be an isolated operation, and would be performed as described previously (e.g., with respect to Table 9 or 12). In either case, the same correction increment (clock correction or channel bonding) increment would be applied to both read addresses Raddr_a and Raddr_b. However, skipping both memory locations A(03) and A(05) would involve the sequence of read addresses Raddr_a and Raddr_b shown in Table 25.

TABLE 25

TRAILING OVERLAPPING OPERATIONS

| Read Clock Cycle | Raddr_a | Raddr_a Increment | Raddr_b | Raddr_b Increment |
|---|---|---|---|---|
| (1) | A(00) | — | A(01) | — |
| (2) | A(02) | 2 | A(04) | 3* |
| (3) | A(06) | 4** | A(07) | 3* |
| (4) | A(08) | 2 | A(09) | 2 |

*nonstandard read increment
**combined nonstandard read increments

As shown in Table 25, the same correction increments cannot be applied to read addresses Raddr_a and Raddr_b if both memory locations A(03) and A(05) are to be skipped. After read address Raddr_b is incremented by three address blocks in read clock cycle (2) (from memory location A(01) to memory location A(04)) to skip memory location A(03), incrementing read address Raddr_a by the same amount (three) during the next read clock cycle would place it at memory location A(05). However, since memory location A(05) must also be skipped, read address Raddr_a must actually be incremented by four. In this manner, two clock correction and/or channel bonding operations are combined in read cycle (3) for read address Raddr_a. The "combined" correction increment COMB_INCR applied to read address Raddr_a in this case can be given by the formula:

$$COMB\_INCR = INCR\_TR + INCR\_LD - INCR\_STD \quad (c)$$

where INCR_TR is the correction increment for a trailing address adjustment for an accelerating (isolated) operation, INCR_LD is the correction increment for a leading address adjustment for an accelerating (isolated) operation, and INCR_STD is the standard increment applied during normal read operations. In the present example, both INCR_TR and INCR_LD are equal to three, while INCR_STD is equal to two, giving a combined clock correction increment COMB_INCR of four (=3+3−2). Note that because the overlapping operation begins with trailing read address Raddr_b (at memory location A(04)), Table 25 depicts "trailing overlapping operations."

This same technique can be applied to overlapping operations that begin with leading read address Raddr_a, with INCR_LD and COMB_INCR being applied to read addresses Raddr_a and Raddr_b, respectively during a first read clock cycle, and INCR_TR being applied to read address Raddr_a during the next read clock cycle. For example, read address Raddr_a might address memory location A(01) shown in Table 24. Then, skipping both memory locations A(03) and A(05) to perform accelerating operations would involve the sequence of read addresses Raddr_a and Raddr_b shown in Table 26.

TABLE 26

LEADING OVERLAPPING OPERATIONS

| Read Clock Cycle | Raddr_a | Raddr_a Increment | Raddr_b | Raddr_b Increment |
|---|---|---|---|---|
| (1) | A(01) | — | A(02) | — |
| (2) | A(04) | 3* | A(06) | 4** |
| (3) | A(07) | 3* | A(08) | 2 |
| (4) | A(09) | 2 | A(10) | 2 |

*nonstandard read increment
**combined nonstandard read increments

Because the overlapping operation begins with leading read address Raddr_a (at memory location A(02)), Table 26 depicts "leading overlapping operations." Just as with the trailing overlapping operations shown in Table 25, in the leading overlapping operations shown in Table 26, the same correction increments cannot be applied to read addresses Raddr_a and Raddr_b if both memory locations A(03) and A(05) are to be skipped. Accordingly, in read clock cycle (2), read address Raddr_a is incremented by regular correction increment (three) to skip memory location A(03) while read address Raddr_b is incremented by the combined correction increment COMB_INCR (four, as calculated using formula (c)). Then during the following read clock cycle, read address Raddr_a is incremented by the regular correction increment (three) to complete the overlapping operations.

Note that in contrast to the trailing overlapping operations described with respect to Table 25, both of the correction operations that take place during the leading overlapping operations begin during the same read clock cycle (read clock cycle (2)). It could therefore be difficult to indicate leading overlapping operations using the reduced-count control signal set described with respect to Table 23, requiring that additional logic be programmed into read control circuit 213. Therefore, to simplify matters, one additional control signal could be provided by operational control circuit 211 to identify leading overlapping operations. For example, stagger control signal STAG could comprise a two-bit signal, thereby allowing both isolated trailing and leading overlapping operations to be identified. Note further that according to another embodiment of the invention, trailing address adjustments immediately followed by leading address adjustments (or leading address adjustments immediately followed by trailing address adjustments) can be prohibited by controller 210, thereby avoiding overlapping operations altogether.

Although the present invention has been described in connection with several embodiments, it is understood that this invention is not limited to the embodiments disclosed, but is capable of various modifications that would be apparent to one of ordinary skill in the art. For example, the flexible elastic buffer control may be extended for elastic buffers that write and read more than two blocks per write and read cycle. Also, the number of stagger control bits STAG may be increased to allow the identification of any of the several blocks read in one cycle as the first block for which a correction or alignment should be applied. Thus, the invention is limited only by the following claims.

We claim:

1. An elastic buffer for a stream of data blocks, each of the data blocks having a first width, the elastic buffer storing a first quantity of consecutive data blocks from the stream of data blocks in response to a write clock signal, the elastic buffer comprising:

a memory space comprising a plurality of memory locations, each of the memory locations having the first width; and a controller circuit comprising:

a write logic circuit for generating at least one write address in response to the write clock signal, the at least one write address corresponding to a second quantity of contiguous memory locations in the memory space for storing the first quantity of consecutive data blocks, the second quantity being the same as the first quantity; and a read logic circuit for generating a plurality of read addresses in response to a read clock signal, the plurality of read addresses corresponding to a third quantity of memory locations in the memory space, the third quantity being the same as the first quantity, wherein the third quantity of memory locations can be non-contiguous, wherein the plurality of memory locations are arranged in a fourth quantity of substantially identical memory arrays, the fourth quantity being the same as the first quantity, wherein the at least one write address corresponds to the same plurality of contiguous memory locations in each of the plurality of substantially identical memory arrays, and wherein each of the third quantity of memory locations is included in a different one of the fourth quantity of substantially identical memory arrays.

2. The elastic buffer of claim 1, wherein the plurality of memory locations are arranged in a single memory array.

3. An elastic buffer for a stream of data blocks, each of the data blocks having a first width, the elastic buffer storing a first quantity of consecutive data blocks from the stream of data blocks in response to a write clock signal, the elastic buffer comprising:

a memory space comprising a plurality of memory locations, each of the memory locations having the first width; and a controller circuit comprising:

a write logic circuit for generating at least one write address in response to the write clock signal, the at least one write address corresponding to a second quantity of contiguous memory locations in the memory space for storing the first quantity of consecutive data blocks, the second quantity being the same as the first quantity;

a read logic circuit for generating a plurality of read addresses in response to a read clock signal, the plurality of read addresses corresponding to a third quantity of memory locations in the memory space, the third quantity being the same as the first quantity, wherein the third quantity of memory locations can be non-contiguous;

an operational control circuit for monitoring the stream of data blocks for specified sequences of one or more clock correction data blocks, the operational control circuit providing a clock correction signal and a first correction increment signal to the read control circuit, wherein during an isolated clock correction operation, the operational control circuit sets the first correction increment signal to specify a first clock correction increment and places the clock correction signal in a first state to instruct the read control circuit to apply the first clock correction increment to the first read address and the second read address, and wherein the operational control circuit further provides a stagger control signal to the read control circuit, wherein when the operational control circuit places the stagger control signal in a third state during the isolated clock correction operation, the read control circuit applies the first clock correction increment to the first read address and the second read address during a single read clock cycle, and wherein when the operational control circuit places the stagger control signal in a fourth state during the isolated clock correction operation, the read control circuit applies the first clock correction increment to the second read address during a first read clock cycle and applies the first clock correction increment to the first read address during a second read clock cycle, the second read clock cycle immediately following the first read clock cycle.

4. The elastic buffer of claim 3, wherein when the isolated clock correction operation comprises an accelerating operation and the first read address corresponds to a first correction block in a correction block sequence, the operational control circuit places the stagger control signal in the third state, and wherein when the isolated clock correction operation comprises a delaying operation and the first read address corresponds to a last correction block in the correction block sequence, the operational control circuit places the stagger control signal in the fourth state, and wherein when the isolated clock correction operation comprises an accelerating operation and the second read address corresponds to the first correction block in the correction block sequence, the operational control circuit places the stagger control signal in the fourth state, and wherein when the isolated clock correction operation comprises a delaying operation and the second read address corresponds to the last correction block in the correction block sequence, the operational control circuit places the stagger control signal in the third state.

5. The elastic buffer of claim 3, wherein the read control circuit increments the first read address and the second read address by a standard increment during each read clock cycle during normal read operations of the elastic buffer, wherein during a first read clock cycle of a trailing overlapping clock correction operation, the operational control circuit sets the first correction increment signal to specify a second clock correction increment and places the clock correction signal and the stagger control signal in the first state and the fourth state, respectively, to instruct the read control circuit to apply the standard increment to the first read address and apply the second clock correction increment to the second read address, and wherein during a second read clock cycle of the trailing overlapping clock correction operation, the second read clock cycle of the trailing overlapping clock correction operation immediately following the first read clock cycle of the trailing overlapping clock correction operation, the operational control circuit sets the first correction increment signal to specify a third clock correction increment and places the clock correction signal and the stagger control signal in the first state and the third state, respectively, to instruct the read control circuit to apply the second clock correction increment plus the third clock correction increment minus the standard increment to the first read address and apply the third clock correction increment to the second read address.

6. The elastic buffer of claim 5, the operational control circuit further providing a second correction increment signal to the read control circuit, wherein during a first read clock cycle of a leading overlapping clock correction operation, the operational control circuit sets the first correction increment signal and the second correction increment signal to specify a fourth clock correction increment and a fifth clock correction increment, respectively, and places the clock correction signal and the stagger control signal in the first state and a fifth state, respectively, to instruct the read control circuit to apply the fourth clock correction increment to the first read address and apply the fourth clock correction increment plus a fifth clock correction increment minus the standard increment to the second read address, and wherein during a second read clock cycle of the leading overlapping clock correction operation immediately following the first read clock cycle of the leading overlapping clock correction operation, the operational control circuit sets the first correction increment signal to specify the fifth clock correction increment and places the clock correction signal and the stagger control signal in the second state and the third state, respectively, to instruct the read control circuit to apply the fifth clock correction increment to the first read address and apply the standard increment to the second read address.

7. The elastic buffer of claim 5, wherein the stagger control signal is generated by a single bit.

8. The elastic buffer of claim 3, wherein the stream of data blocks comprises a 10 gigabit extended Attachment Unit Interface (XAUI) data stream.

9. The elastic buffer of claim 3, wherein the stream of data blocks comprises an InfiniBand data stream.

10. The elastic buffer of claim 3, wherein the stream of data blocks comprises a Gigabit Ethernet data stream.

11. The elastic buffer of claim 3, wherein the stream of data blocks comprises a Fibre Channel data stream.

12. A multi-channel elastic buffer for buffering an input data stream, the input data stream comprising a series of data blocks, each of the data blocks having a first width, the input data stream being divided into a plurality of partial input data streams, wherein the multi-channel elastic buffer comprises a plurality of individual elastic buffers, each of the plurality of individual elastic buffers being coupled to receive an associated one of the plurality of Partial input data streams, wherein each of the plurality of individual elastic buffers comprises:
 a memory space comprising a plurality of memory locations, each of the memory locations having the first width; and
 a controller circuit comprising:
 a write logic circuit for generating at least one write address in response to a write clock signal, the at least one write address corresponding to a first quantity of contiguous memory locations in the memory space for storing a second quantity of consecutive data blocks from the associated one of the plurality of partial input data streams, the second quantity being the same as the first quantity; and
 a read logic circuit for generating a plurality of read addresses in response to a read clock signal, the plurality of read addresses corresponding to a third quantity of memory locations in the memory space, the third quantity being the same as the first quantity, wherein the third quantity of memory locations can be non-contiguous,
 wherein each of the plurality of individual elastic buffers recognizes a reference alignment data block sequence within the associated one of the plurality of partial input data streams, wherein one of the plurality of individual elastic buffers is a master elastic buffer and the remainder of the plurality of individual elastic buffers are slave elastic buffers, and wherein the controller circuit of the master elastic buffer further comprises an operational control circuit configured to generate a channel bonding signal after reading a specified quantity of data blocks from the memory space of the master elastic buffer beginning with a first alignment data block in the reference alignment data block sequence from the memory space of the master elastic buffer, the channel bonding signal causing each of the slave elastic buffers to initiate a channel bonding adjustment.

13. The multi-channel elastic buffer of claim 12, wherein when the master elastic buffer generates the channel bonding signal, the master elastic buffer setting its plurality of read addresses to address memory locations in the master elastic buffer having a plurality of relative positions with respect to the reference alignment block sequence stored in the memory space of the master elastic buffer, and wherein the channel bonding adjustments cause each of the slave elastic buffers to adjust the plurality of read addresses of the slave elastic buffer so that each of the memory locations addressed by the plurality of read addresses of the slave elastic buffer has a relative position with respect to the reference alignment block sequence stored in the memory space of the slave elastic buffer that is equal to one of the plurality of relative positions of the master elastic buffer.

14. The multi-channel elastic buffer of claim 12, wherein the first quantity is equal to two data blocks, and wherein the plurality of read addresses for each of the plurality of individual elastic buffers consists of a first read address and a second read address for reading a first data block and a second data block, respectively, from the memory space of that one of the plurality of individual elastic buffers during a single read clock cycle, wherein the first data block is read before the second data block in the single read clock cycle.

15. The multi-channel elastic buffer of claim 14, wherein the operational control circuit further provides a stagger control signal to each of the slave elastic buffers, wherein when the stagger control signal is in a first state during the channel bonding adjustment, each of the slave elastic buffers applies a channel bonding increment to the first read address and the second read address during the same read clock cycle, and wherein when the stagger control signal is in a second state during the channel bonding adjustment, each of the slave elastic buffers applies the channel bonding increment to the second read address during a first read clock cycle and applies the channel bonding increment to the first read address during a second read clock cycle, the second read clock cycle immediately following the first read clock cycle.

16. The multi-channel elastic buffer of claim 15, wherein the stagger control signal is provided by a single bit.

17. The multi-channel elastic buffer of claim 15, wherein the reference alignment data block sequence consists of a fourth quantity of alignment data blocks, wherein when the data block addressed by the first read address in the master elastic buffer comprises a first alignment data block in the reference alignment data block sequence stored in the memory space of the master elastic buffer, the stagger control signal is set to the first state when the specified quantity is even, and the stagger control signal is set to the second state when the specified quantity is odd, and wherein when the data block addressed by the second read address in the master elastic buffer comprises the first block of the reference alignment data block sequence stored in the memory space of the master elastic buffer, the stagger control signal is set to the second state when the specified quantity is even, and the stagger control signal is set to the first state when the specified quantity is odd.

18. The multi-channel elastic buffer of claim 15, wherein the operational control signal generates the channel bonding signal a fourth quantity of read clock cycles after reading a first block of the reference alignment data block sequence stored in the memory space of the master elastic buffer, wherein when the data block addressed by the first read address in the master elastic buffer comprises the first alignment data block, the fourth quantity is equal to half of the specified quantity when the specified quantity is even, and the fourth quantity is equal to half of one less than the specified quantity when the specified quantity is odd, and wherein when the data block addressed by the second read address in the master elastic buffer comprises the first alignment data block, the fourth quantity is equal to half of the specified quantity when the specified quantity is even, and the fourth quantity is equal to half of one more than the specified quantity when the specified quantity is odd.

19. The multi-channel elastic buffer of claim 15, wherein the operational control circuit of the master elastic buffer is further configured to recognize a reference clock correction data block sequence in the associated one of the plurality of partial input data streams, the operational control circuit generating a clock correction signal and a clock correction increment during a clock correction operation after recognizing the reference clock correction data block sequence, the clock correction signal instructing the read control circuit in each of the plurality of individual elastic buffers to apply the clock correction increment to each of the plurality of read addresses.

20. The multi-channel elastic buffer of claim 19, wherein when the stagger control signal is in the first state during the clock correction operation, each of the plurality of individual elastic buffers applies the clock correction increment to the first read address and the second read address during the same read clock cycle, and wherein when the stagger control signal is in the second state during the clock correction operation, each of the plurality of elastic buffers applies the clock correction increment to the second read address during a third read clock cycle and applies the clock correction increment to the first read address during a fourth read clock cycle, the fourth read clock cycle following the third read clock cycle.

21. The multi-channel elastic buffer of claim 15, wherein the operational control circuit of the master elastic buffer is further configured to recognize a reference clock correction data block sequence in the associated one of the plurality of partial input data streams, the operational control circuit encoding a clock correction signal and the channel bonding signal into a three-bit combined control signal provided to each of the slave elastic buffers, wherein when the three-bit combined control signal has a first value, the read control circuit of each of the plurality of individual elastic buffers is instructed to add a predefined read increment to each of the plurality of read addresses, and wherein when the three-bit combined control signal has a second value, the read control circuit of each of the plurality of individual elastic buffers is instructed to add two of the predefined read increment to each of the plurality of read addresses, and wherein when the three-bit combined control signal has a third value, each of the slave elastic buffers is instructed to initiate a channel bonding adjustment, and wherein when the three-bit combined control signal has a fourth value, the read control circuit of each of the plurality of individual elastic buffers is instructed to subtract the predefined increment from each of the plurality of read addresses.

22. The elastic buffer of claim 12, wherein the input data stream comprises a 10 gigabit extended Attachment Unit Interface (XAUI) data stream.

23. The elastic buffer of claim 12, wherein the input data stream comprises an InfiniBand data stream.

24. A method for performing a clock correction operation on an elastic buffer configured to buffer a stream of data blocks, the elastic buffer comprising a plurality of memory locations, each of the memory locations having the same width as each of the data blocks, the elastic buffer being configured to read a first data block from a first read address before reading a second data block from a second read address during each read clock cycle, the method comprising:

determining a first read address for a first read clock cycle by incrementing a first initial address by a first read increment;

reading a first one of the plurality of memory locations addressed by the first read address for the first read clock cycle;

determining a second read address for the first read clock cycle by incrementing a second initial address by a first clock correction increment; and reading a second one of the plurality of memory locations addressed by the second read address for the first read clock cycle, wherein the first one of the plurality of memory locations and the second one of the plurality of memory locations are non-contiguous, wherein the first read address and the second read address for each read clock cycle during normal read operations are determined by incrementing a first read address and a second read address, respectively, for a previous read clock cycle by the first read increment;

determining a first read address for a second read clock cycle by incrementing the first read address for the first read clock cycle by the first clock correction increment;

reading a third one of the plurality of memory locations addressed by the first read address for the second read clock cycle;

determining a second read address for the second read clock cycle by incrementing the second read address for the first read clock cycle by the first read increment;

reading a fourth one of the plurality of memory locations addressed by the second read address for the second read clock cycle during the second read clock cycle wherein the second read clock cycle immediately follows the first read clock cycle; and setting a stagger control signal to a first state during the first read clock cycle to instruct the elastic buffer to determine the first read address for the first read clock cycle by incrementing the first initial address by the first read increment, determine the second read address for the first read clock cycle by incrementing the second initial address by the first clock correction increment, determine the first read address for the second read clock cycle be incrementing the first read address for the first read clock cycle by the first clock correction increment, and determine the second read address for the second read clock cycle by incrementing the second read address for the first read clock cycle by the first read increment, wherein setting the stagger control signal to a second state during the first read clock cycle instructs the elastic buffer to determine the first read address for the first read clock cycle by incrementing the first initial address by the first clock correction increment and determine the second read address for the first read clock cycle by incrementing the second initial address by the first clock correction increment.

25. The method of claim 24, wherein the clock correction operation is performed in response to reading a correction block sequence from the plurality of memory locations, the method further comprising:

placing the stagger control signal in the second state when the clock correction operation comprises an isolated accelerating operation and the first initial address corresponds to a first correction block in the correction block sequence;

placing the stagger control signal in the first state when the clock correction operation comprises an isolated accelerating operation and the second initial address corresponds to the first correction block in the correction block sequence;

placing the stagger control signal in the second state when the clock correction operation comprises an isolated delaying operation and the second initial address corresponds to a last correction block in the correction block sequence; and placing the stagger control signal in the first state when the clock correction operation comprises an isolated delaying operation and the first initial address corresponds to the last correction block in the correction block sequence.

26. An elastic buffer for a stream of data blocks, each of the data blocks having a first width, the elastic buffer storing a first quantity of consecutive data blocks from the stream of data blocks in response to a write clock signal, the elastic buffer comprising:

a memory space comprising a plurality of memory locations, each of the memory locations having the first width; and means for controlling the elastic buffer comprising:

means for generating at least one write address in response to the write clock signal, the at least one write address corresponding to a second quantity of contiguous memory locations in the memory space for storing the first quantity of consecutive data blocks, the second quantity being the same as the first quantity; and means for generating a plurality of read addresses in response to a read clock signal, the plurality of read addresses corresponding to a third quantity of memory locations in the memory space, the third quantity being the same as the first quantity, wherein the third quantity of memory locations can be non-contiguous, wherein the plurality of memory locations are arranged in a fourth quantity of substantially identical memory arrays, the fourth quantity being the same as the first quantity, wherein at least one write address corresponds to the same plurality of contiguous memory locations in each of the plurality of substantially identical memory arrays, and wherein each of the third quantity of memory locations for reading is included in a different one of the fourth quantity of substantially identical memory arrays.

27. The elastic buffer of claim 26, wherein the plurality of memory locations are arranged in a single memory array.

28. The elastic buffer of claim 26, wherein the first quantity is equal to two, and wherein the plurality of read addresses consist of a first read address and a second read address for reading a first data block and a second data block, respectively, from the memory space during a normal read operation wherein the first data block comes earlier in the stream of data blocks than the second data block.

29. The elastic buffer of claim 28, wherein the means for controlling the elastic buffer further comprises:

means for monitoring the stream of data blocks for specified sequences of one or more clock correction data blocks; and means for generating a clock correction signal and a clock correction increment during a clock correction operation, the clock correction signal instructing the means for generating the plurality of read addresses to apply the clock correction increment to the first read address and the second read address during isolated clock correction operations.

30. The elastic buffer of claim 29, wherein the means for controlling the elastic buffer further comprises means for generating a stagger control signal, wherein when the stagger control signal is in a first state, the increment signal is applied to the first read address and the second read address during a single read clock cycle, and wherein when the stagger control signal is in a second state, the clock correction increment is applied to the second read address during a first read clock cycle, while the clock correction increment is applied to the first read address during a second read clock cycle, the second read clock cycle following the first read clock cycle.

31. The elastic buffer of claim 30, further comprising:

means for monitoring the stream of data blocks for specified sequences of one or more channel bonding data blocks; and means for generating a channel bonding signal to instruct at least one slave elastic buffer to perform a channel bonding operation.

32. A method for performing a channel bonding operation on an input data stream, the input data stream comprising a series of data blocks, each of the data blocks having a first width, the method comprising:

dividing the input data stream into a plurality of partial input data streams;

feeding each of the plurality of partial input data streams into one of a plurality of elastic buffers, wherein the plurality of elastic buffers consists of a master elastic buffer and a set of slave elastic buffers;

recognizing a reference alignment data block sequence from each of the plurality of partial input data streams;

generating a channel bonding signal after reading a specified number of data blocks including a first alignment data block in the reference alignment data block sequence from a memory space in the master elastic buffer, the channel bonding signal causing each of the set of slave elastic buffers to initiate a channel bonding adjustment, wherein each of the plurality of elastic buffers comprises:

a memory space comprising a plurality of memory locations, each of the memory locations having the first width; and a controller circuit comprising:

a write logic circuit for generating at least one write address in response to a write clock signal, the write address corresponding to a first quantity of contiguous memory locations in the memory space for storing a second quantity of consecutive data blocks from the associated one of the plurality of partial input data streams, the second quantity being the same as the first quantity; and a read logic circuit for generating a plurality of read addresses in response to a read clock signal, the plurality of read addresses corresponding to a third quantity of memory locations in the memory space, the third quantity being the same as the first quantity, wherein the third quantity of memory locations can be non-contiguous.

33. The method of claim 32, wherein when the channel bonding signal is generated, the plurality of read addresses of the master elastic buffer are set to address memory locations in the master elastic buffer having a plurality of relative positions with respect to the reference alignment data block sequence stored in the memory space of the master elastic buffer, the method further comprising adjusting the plurality of read addresses for each one of the set of slave elastic buffers so that each of the plurality of read addresses for that one of the set of slave elastic buffers has a relative position with respect to the reference alignment data block sequence stored in the memory space of that one of the set of slave elastic buffers that is equal to one of the plurality of relative positions of the master elastic buffer.

34. The method of claim 33, wherein the first quantity is equal to two, and wherein the plurality of read addresses for each of the plurality of elastic buffers consists of a first read address and a second read address for reading a first memory data block and a second data block, respectively, during a single read clock cycle, wherein the first data block is read before the second data block in the single read clock cycle, the method further comprising:

setting a stagger control signal to a first state to instruct each one of the set of slave elastic buffers to apply a channel bonding increment to the first read address and the second read address of that one of the set of slave elastic buffers during the same read clock cycle; and setting the stagger control signal to a second state to instruct each one of the set of slave elastic buffers to apply the channel bonding increment to the second read address of that one of the set of slave elastic buffers during a first read clock cycle and apply the channel bonding increment to the first read address of that one of the set of slave elastic buffers during a second read clock cycle, the second read clock cycle immediately following the first read clock cycle.

35. The method of claim 34, further comprising:

setting the stagger control signal to the first state when the first alignment data block is addressed by the first read address of the master elastic buffer and the specified number of data blocks is even;

setting the stagger control signal to the second state when the first alignment data block is addressed by the first read address of the master elastic buffer and the specified number of data blocks is odd;

setting the stagger control signal to the second state when the first alignment data block is addressed by the second read address of the master elastic buffer and the specified number of data blocks is even; and setting the stagger control signal to the first state when the first alignment data block is addressed by the second read address of the master elastic buffer and the specified number of data blocks is odd.

* * * * *